US011191032B2

(12) United States Patent
Cho et al.

(10) Patent No.: US 11,191,032 B2
(45) Date of Patent: Nov. 30, 2021

(54) ELECTRONIC DEVICE COMPRISING ANTENNA AND POWER BACKOFF CONTROL METHOD FOR THE ELECTRONIC DEVICE

(71) Applicant: Samsung Electronics Co., Ltd., Suwon-si (KR)

(72) Inventors: Woosik Cho, Suwon-si (KR); Kyungrok Lee, Suwon-si (KR); Hyeongjoo Oh, Suwon-si (KR); Minhwan Jeon, Suwon-si (KR); Daeyoung Jo, Suwon-si (KR); Kwan Heo, Suwon-si (KR); Wonhyung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/936,217

(22) Filed: Jul. 22, 2020

(65) Prior Publication Data

US 2021/0029644 A1 Jan. 28, 2021

(30) Foreign Application Priority Data

Jul. 22, 2019 (KR) .................... 10-2019-0088248

(51) Int. Cl.
*H04W 52/14* (2009.01)
*H04W 52/28* (2009.01)
(Continued)

(52) U.S. Cl.
CPC ....... *H04W 52/146* (2013.01); *H04W 52/288* (2013.01); *H04W 52/38* (2013.01); *H04W 88/06* (2013.01)

(58) Field of Classification Search
CPC . H04W 52/42; H04W 52/146; H04W 52/288; H02J 50/80
(Continued)

(56) References Cited

U.S. PATENT DOCUMENTS 8,509,838 B2 8/2013 Lee et al.
9,246,846 B2 1/2016 Fan et al.
(Continued)

OTHER PUBLICATIONS

International Search Report dated Dec. 29, 2020 in connection with International Patent Application No. PCT/KR2020/009555, 3 pages.

*Primary Examiner* — John J Lee

(57) ABSTRACT

An electronic device includes a first antenna that transmits/receives a signal in a first frequency band, a second antenna that transmits/receives a signal in a second frequency band, a first wireless communication circuit connected with the first antenna, a second wireless communication circuit connected with the second antenna, at least one processor connected with the first and second wireless communication circuits, and a memory. The memory stores instructions that cause the processor to output a first signal with a first power to control the first wireless communication circuit to output the first signal through the first antenna, and output the first signal with a power, which is obtained by backing off from the first power as much as a first backoff value, to control the second wireless communication circuit to output a second signal through the second antenna while controlling the first wireless communication circuit to output the first signal.

18 Claims, 13 Drawing Sheets

(51) Int. Cl.
*H04W 52/38* (2009.01)
*H04W 88/06* (2009.01)

(58) Field of Classification Search
USPC ............... 455/522, 69, 66.1, 67.11, 279.1
See application file for complete search history.

(56) References Cited

U.S. PATENT DOCUMENTS

| | | |
|---|---|---|
| 9,531,420 B1 | 12/2016 | Prendergast et al. |
| 9,906,256 B2 | 2/2018 | Prendergast et al. |
| 10,397,877 B2 | 8/2019 | Jeon et al. |
| 10,420,023 B2 | 9/2019 | Ramasamy et al. |
| 2011/0243208 A1* | 10/2011 | Shany ............... H04L 1/0026 |
| | | 375/224 |
| 2011/0263216 A1 | 10/2011 | Lee et al. |
| 2013/0058319 A1 | 3/2013 | Fan et al. |
| 2015/0201387 A1 | 7/2015 | Khawand et al. |
| 2017/0077977 A1 | 3/2017 | Prendergast et al. |
| 2018/0288707 A1* | 10/2018 | Jeon ................... H02J 50/80 |
| 2019/0215765 A1 | 7/2019 | Ramasamy et al. |
| 2020/0015161 A1 | 1/2020 | Ramasamy et al. |
| 2020/0205087 A1* | 6/2020 | Hong .................. H04B 1/3838 |

* cited by examiner

ELECTRONIC DEVICE COMPRISING ANTENNA AND POWER BACKOFF CONTROL METHOD FOR THE ELECTRONIC DEVICE

CROSS-REFERENCE TO RELATED APPLICATION

This application is based on and claims priority under 35 U.S.C. § 119 to Korean Patent Application No. 10-2019-0088248 filed on Jul. 22, 2019 in the Korean Intellectual Property Office, the disclosure of which is incorporated by reference herein its entirety.

BACKGROUND

1. Field

The disclosure relates to an electronic device that includes an antenna to perform communication with the outside and a power backoff control method according to an operation of the antenna of the electronic device.

2. Description of Related Art

As mobile communication technologies develop, an electronic device, which is equipped with an antenna, such as a smartphone or a wearable device is being widely supplied. The electronic device may receive or transmit a signal including data (e.g., a message, a photo, a video, a music file, a game, and the like) by using the antenna. The electronic device may implement the antenna by using a plurality of antenna elements for the purpose of receiving or transmitting a signal more efficiently. For example, the electronic device may include one or more antenna arrays where there are arranged a plurality of antenna elements.

The above information is presented as background information only to assist with an understanding of the disclosure. No determination has been made, and no assertion is made, as to whether any of the above might be applicable as prior art with regard to the disclosure.

SUMMARY

In the case of wireless communication, it is necessary to satisfy a specific constraint condition. A wireless mobile terminal is used in a state where the terminal is close to his/her face or contacts his/her head or body. In this case, a portion of radio frequency (RF) energy radiated from the wireless mobile terminal is absorbed by his/her body, and the absorbed energy is changed into thermal energy. Electromagnetic waves that the wireless mobile terminal generates in a wireless communication situation are capable of having a negative influence on his/her body. For this reason, when the wireless mobile terminal outputting a wireless communication signal approaches his/her body, it is necessary to limit the degree to which his/her body is exposed to the electromagnetic waves. For example, a lot of nations regulate to satisfy a reference for a specific absorption rate (SAR) being an index indicating the SAR for the body. The SAR is a measure of the rate at which energy is absorbed per unit mass by a human body when exposed to a radio frequency (RF) electromagnetic field and has units of watts per kilogram (W/kg).

A power backoff operation may be performed in a way to reduce a power to be input or fed to an antenna module in consideration of a reference for electromagnetic waves emitted from an electronic device.

Aspects of the disclosure are to address at least the above-mentioned problems and/or disadvantages and to provide at least the advantages described below. Accordingly, an aspect of the disclosure is to provide an electronic device controlling a power backoff value in consideration of a reference for electromagnetic waves and a characteristic of an antenna.

In accordance with an aspect of the disclosure, an electronic device includes a first antenna that transmits/receives a signal in a first frequency band based on a first radio access technology (RAT), a second antenna that transmits/receives a signal in a second frequency band based on a second RAT, a first wireless communication circuit that is operatively connected with the first antenna, a second wireless communication circuit that is operatively connected with the second antenna, at least one processor that is operatively connected with the first wireless communication circuit and the second wireless communication circuit, and a memory that is operatively connected with the processor, and the memory stores instructions that, when executed, cause the processor to output a first signal with a first power in the case of controlling the first wireless communication circuit to output the first signal through the first antenna and to output the first signal with a power, which is obtained by backing off from the first power as much as a first backoff value, in the case of controlling the second wireless communication circuit to output a second signal through the second antenna while controlling the first wireless communication circuit to output the first signal through the first antenna.

In accordance with another aspect of the disclosure, an electronic device includes a first antenna that transmits/receives a signal in a first frequency band based on a first RAT, a second antenna that transmits/receives a signal in a second frequency band based on a second RAT, a first wireless communication circuit that is operatively connected with the first antenna, a second wireless communication circuit that is operatively connected with the second antenna, at least one processor that is operatively connected with the first wireless communication circuit and the second wireless communication circuit, and a memory that is operatively connected with the processor, and the memory stores instructions that, when executed, cause the processor to output a first signal with a first power in the case of controlling the first wireless communication circuit to output the first signal through the first antenna and to output the first signal with a power, which is obtained by backing off from the first power as much as a first backoff value, in the case of controlling the second wireless communication circuit to output a second signal through the second antenna while controlling the first wireless communication circuit to output the first signal through the first antenna.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, similar components may be marked by similar reference numerals.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Below, referring to FIG. 1, a configuration of an electronic device according to an embodiment is described.

Figure 1:
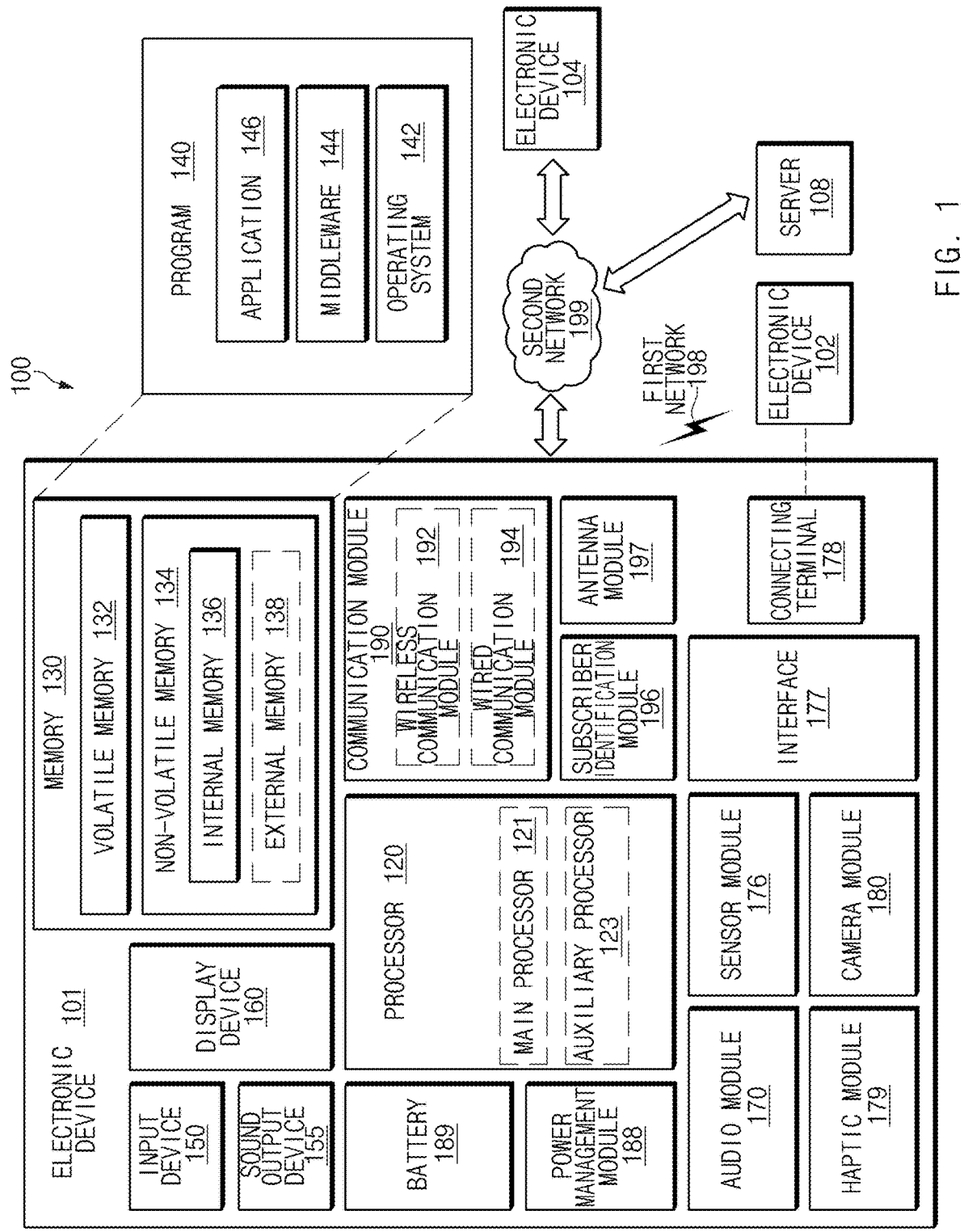
FIG. 1 illustrates a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may be implemented with a conductive material or a conductive pattern. According to an embodiment, the antenna module 197 may include an additional another part (e.g., RFIC) in addition to the conductive material or the conductive pattern. According to an embodiment, the antenna module 197 may include a plurality of antennas, and at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Below, a structure of an electronic device according to an embodiment will be described with reference to FIGS. 2 to 4. Components identical to the components of the embodiment described above will be described with reference to the same reference numerals, and the corresponding component may be presented as an example. With regard to components identical to the components of the embodiment described above, additional description will be omitted to avoid redundancy.

Figure 2:
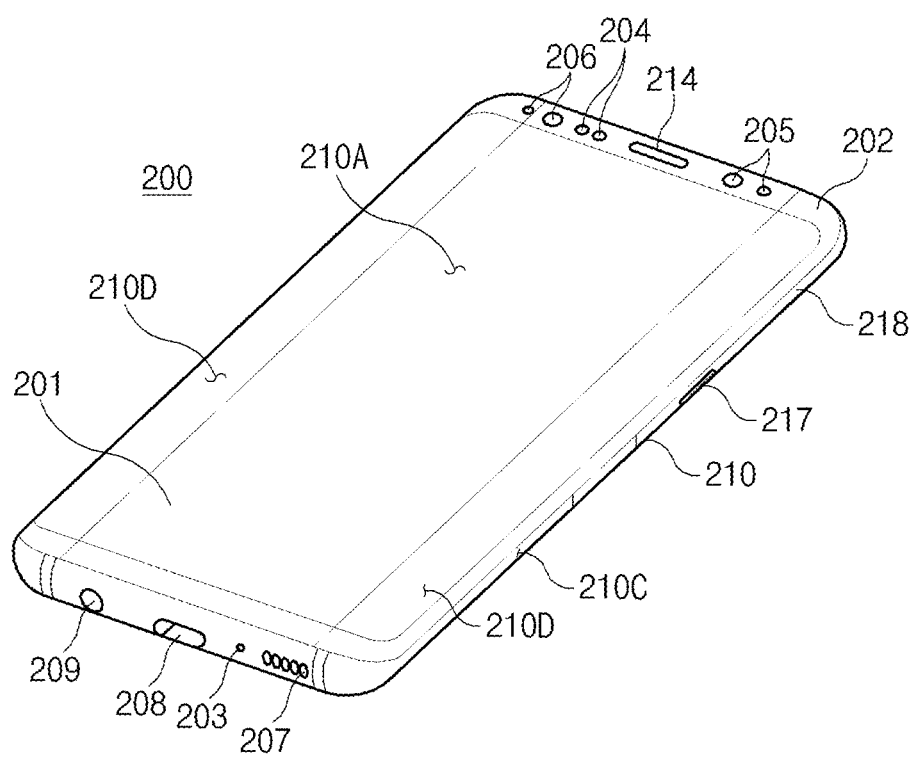
FIG. 2 illustrates a front perspective view of a mobile electronic device according to various embodiments.

FIG. 2 illustrates a front perspective view of a mobile electronic device 200 (e.g., the electronic device 101 of FIG. 1), according to various embodiments. FIG. 3 illustrates a back perspective view of the mobile electronic device 200 according to various embodiments. FIG. 4 illustrates an exploded perspective view of the mobile electronic device 200 according to various embodiments.

Figure 3:
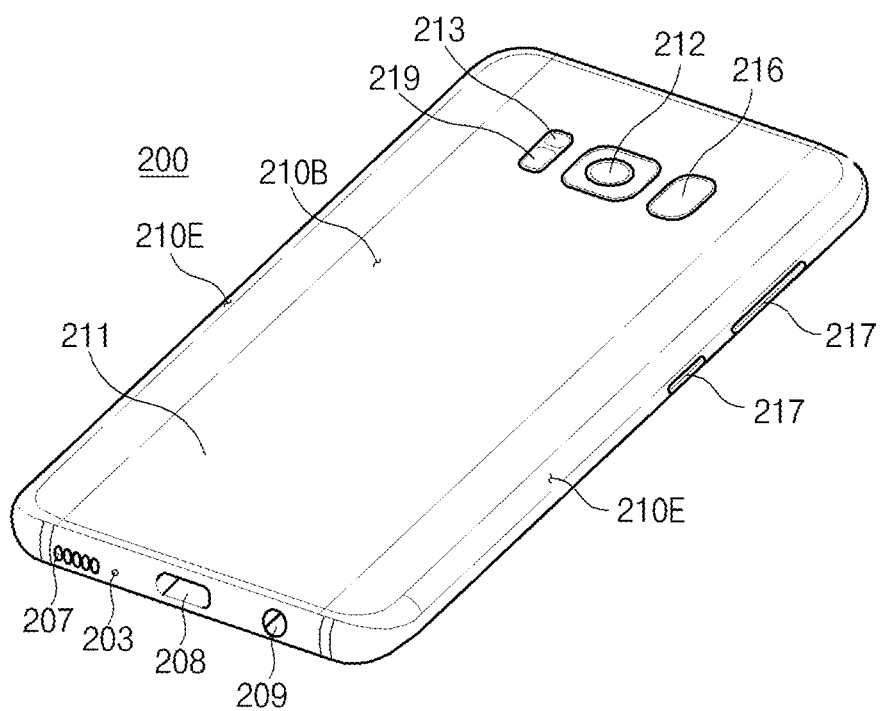
FIG. 3 illustrates a back perspective view of an electronic device according to various embodiments.

Referring to FIGS. 2 and 3, the mobile electronic device 200 (e.g., the electronic device 101 of FIG. 1) according to various embodiments may include a housing 210 that includes a first surface (or a front surface) 210A, a second surface (or a back surface) 210B, and a side surface 210C surrounding a space between the first surface 210A and the second surface 210B. In an embodiment, the housing 210 may be referred to as a "structure" that forms a part of the first surface 210A, the second surface 210B, and the side surface 210C. According to an embodiment, the first surface 210A may be formed by a front plate 202 (e.g., a glass plate including various coating layers, or a polymer plate), at least a portion of which is substantially transparent. The second surface 210B may be formed by a back plate 211 that is substantially opaque. For example, the back plate 211 may be formed by a coated or colored glass, a ceramic, a polymer, a metal (e.g., aluminum, stainless steel (STS), or magnesium), or a combination of at least two of the materials. The side surface 210C may be coupled to the front plate 202 and the back plate 211, and may be formed by a side bezel structure (or a "side member") 218 including a metal and/or a polymer. In any embodiment, the back plate 211 and the side bezel structure 218 may be integrally formed and may include the same material (e.g., a metal material such as aluminum).

In the embodiment that is illustrated, the front plate 202 may include two first regions 210D, which are bent toward the back plate 211 from the first surface 210A so as to be seamlessly extended, at opposite long edges of the front plate 202. In the embodiment (refer to FIG. 3) that is illustrated, the back plate 211 may include two second regions 210E, which are bent toward the front plate 202 from the second surface 210B so as to be seamlessly extended, at opposite long edges thereof. In any embodiment, the front plate 202 (or the back plate 211) may include one of the first regions 210D (or the second regions 210E). In an embodiment, a part of the first regions 210D or the second regions 210E may not be included. In the embodiments, when viewed from one side of the electronic device 200, the side bezel structure 218 may have a first thickness (or width) on one side where the first region 210D or the second region 210E is not included, and may have a second thickness smaller than the first thickness on one side where the first region 210D or the second region 210E is included.

According to an embodiment, the electronic device 200 may include at least one or more of a display 201, an audio module (203, 207, 214), a sensor module (204, 216, 219), a camera module (205, 212, 213), a key input device 217, a light-emitting device 206, and a connector hole (208, 209). In any embodiment, the electronic device 200 may not include at least one (e.g., the key input device 217 or the light-emitting device 206) of the components or may further include any other component.

The display 201 may be exposed, for example, through a considerable portion of the front plate 202. In any embodiment, at least a portion of the display 201 may be exposed through the first surface 210A and the front plate 202 forming the first region 210D of the side surface 210C. In any embodiment, a corner of the display 201 may be formed to be mostly identical in shape to an outer portion of the front plate 202 adjacent thereto. In an embodiment, to increase the area where the display 201 is exposed, an interval between an outer portion of the display 201 and an outer portion of the front plate 202 may be formed mostly identically.

In an embodiment, a recess or an opening may be formed at a portion of a screen display region of the display 201, and at least one or more of the audio module 214, the sensor module 204, the camera module 205, and the light-emitting device 206 may be provided to be aligned with the recess or the opening. In an embodiment, at least one or more of the audio module 214, the sensor module 204, the camera module 205, the fingerprint sensor 216, and the light-emitting device 206 may be provided on a back surface of the display 201, which corresponds to the screen display region. In an embodiment, the display 201 may be combined with a touch sensing circuit, a pressure sensor capable of measuring the intensity (or pressure) of a touch, and/or a digitizer capable of detecting a magnetic stylus pen or may be disposed adjacent thereto. In any embodiment, at least a part of the sensor module (204, 219) and/or at least a part of the key input device 217 may be disposed in the first region 210D and/or the second region 210E.

The audio module (203, 207, 214) may include the microphone hole 203 and the speaker hole (207, 214). A microphone for obtaining external sound may be disposed within the microphone hole 203; in any embodiment, a plurality of microphones may be disposed to detect a direction of sound. The speaker hole (207, 214) may include the external speaker hole 207 and the receiver hole 214 for call.

In any embodiment, the speaker hole (207, 214) and the microphone hole 203 may be implemented with one hole, or a speaker (e.g., a piezo speaker) may be included without the speaker hole (207, 214).

The sensor module (204, 216, 219) may generate an electrical signal or a data value that corresponds to an internal operation state of the electronic device 200 or corresponds to an external environment state. The sensor module (204, 216, 219) may include, for example, the first sensor module 204 (e.g., a proximity sensor) and/or a second sensor module (e.g., a fingerprint sensor) disposed on the first surface 210A of the housing 210, and/or the third sensor module 219 (e.g., a hear rate monitor (HRM) sensor) and/or the fourth sensor module 216 (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include a sensor module, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or the illumination sensor.

The camera module (205, 212, 213) may include the first camera device 205 disposed on the first surface 210A of the electronic device 200, and the second camera module 212 and/or the flash 213 disposed on the second surface 210B. The camera module (205, 212) may include one or more lenses, an image sensor, and/or an image signal processor. The flash 213 may include, for example, a light-emitting diode or a xenon lamp. In any embodiment, two or more lenses (e.g., an infrared camera and wide-angle and telephoto lenses) and image sensors may be disposed on one surface of the electronic device 200.

The key input device 217 may be disposed on the side surface 210C of the housing 210. In an embodiment, the electronic device 200 may not include all or a part of the key input devices 217, and the key input device(s) not included may be implemented on the display 201 in the form of a soft key. In any embodiment, the key input device 217 may include the sensor module 216 disposed on the second surface 210B of the housing 210.

The light-emitting device 206 may be disposed, for example, on the first surface 210A of the housing 210. The light-emitting device 206 may provide status information of the electronic device 200, for example, in the form of light. In an embodiment, the light-emitting device 206 may provide, for example, a light source that operates in conjunction with an operation of the camera module 205. The light-emitting device 206 may include, for example, a light-emitting diode (LED), an IR LED, and a xenon lamp.

The connector hole (208, 209) may include the first connector hole 208 that is capable of accommodating a connector (e.g., a USB connector) for transmitting/receiving a power and/or data with an external electronic device, and/or the second connector hole (or an earphone jack) 209 that is capable of accommodating a connector for transmitting/receiving an audio signal with the external electronic device.

Figure 4:
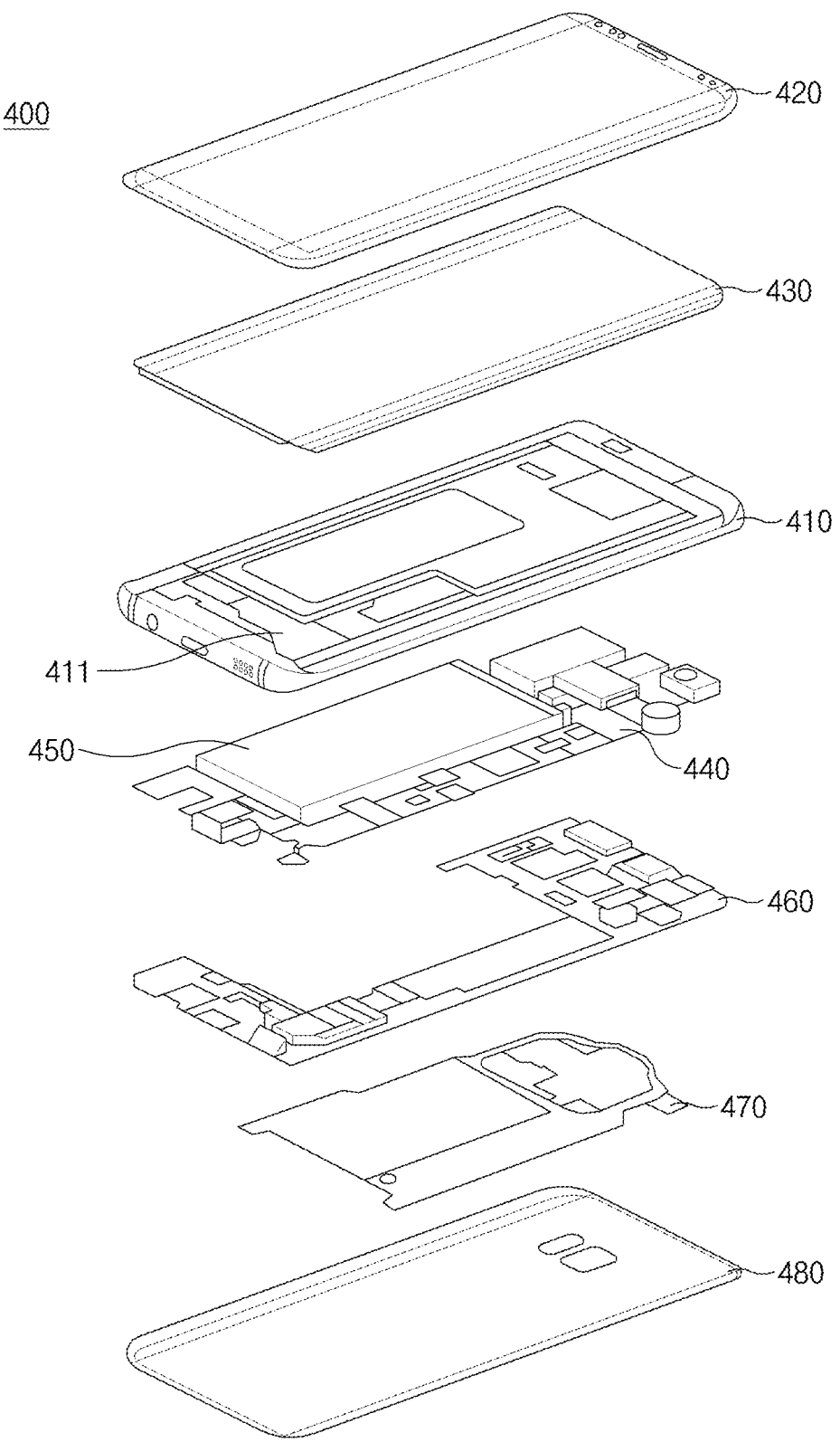
FIG. 4 illustrates an exploded perspective view of a mobile electronic device according to various embodiments.

Referring to FIG. 4, a mobile electronic device 400 (e.g., the mobile electronic device 200 of FIG. 2) may include a side bezel structure 410, a first support member 411 (e.g., a bracket), a front plate 420, a display 430, a printed circuit board 440, a battery 450, a second support member 460 (e.g., a rear case), an antenna 470, and a back plate 480. In any embodiment, the electronic device 400 may not include at least one (e.g., the first support member 411 or the second support member 460) of the components or may further include any other component. At least one of the components of the electronic device 400 may be identical to or similar to at least one of the components of the electronic device 200 of FIG. 2 or 3, and thus, additional description will be omitted to avoid redundancy.

The first support member 411 may be disposed within the electronic device 400 so as to be connected with the side bezel structure 410, or may be integrally formed with the side bezel structure 410. The first support member 411 may be formed of, for example, a metal material and/or a nonmetal material (e.g., polymer). The display 430 may be coupled to one surface of the first support member 411, and the printed circuit board 440 may be coupled to an opposite surface of the first support member 411. A processor, a memory, and/or an interface may be mounted on the printed circuit board 440. The processor may include, for example, one or more of a central processing unit, an application processor, a graphic processing device, an image signal processor, a sensor hub processor, or a communication processor.

Below, a structure for supporting legacy network communication and 5G network communication of an electronic device according to an embodiment will be described with reference to FIG. 5. Components identical to the components of the embodiment described above will be described with reference to the same reference numerals, and the corresponding component may be presented as an example. With regard to components identical to the components of the embodiment described above, additional description will be omitted to avoid redundancy.

Figure 5:
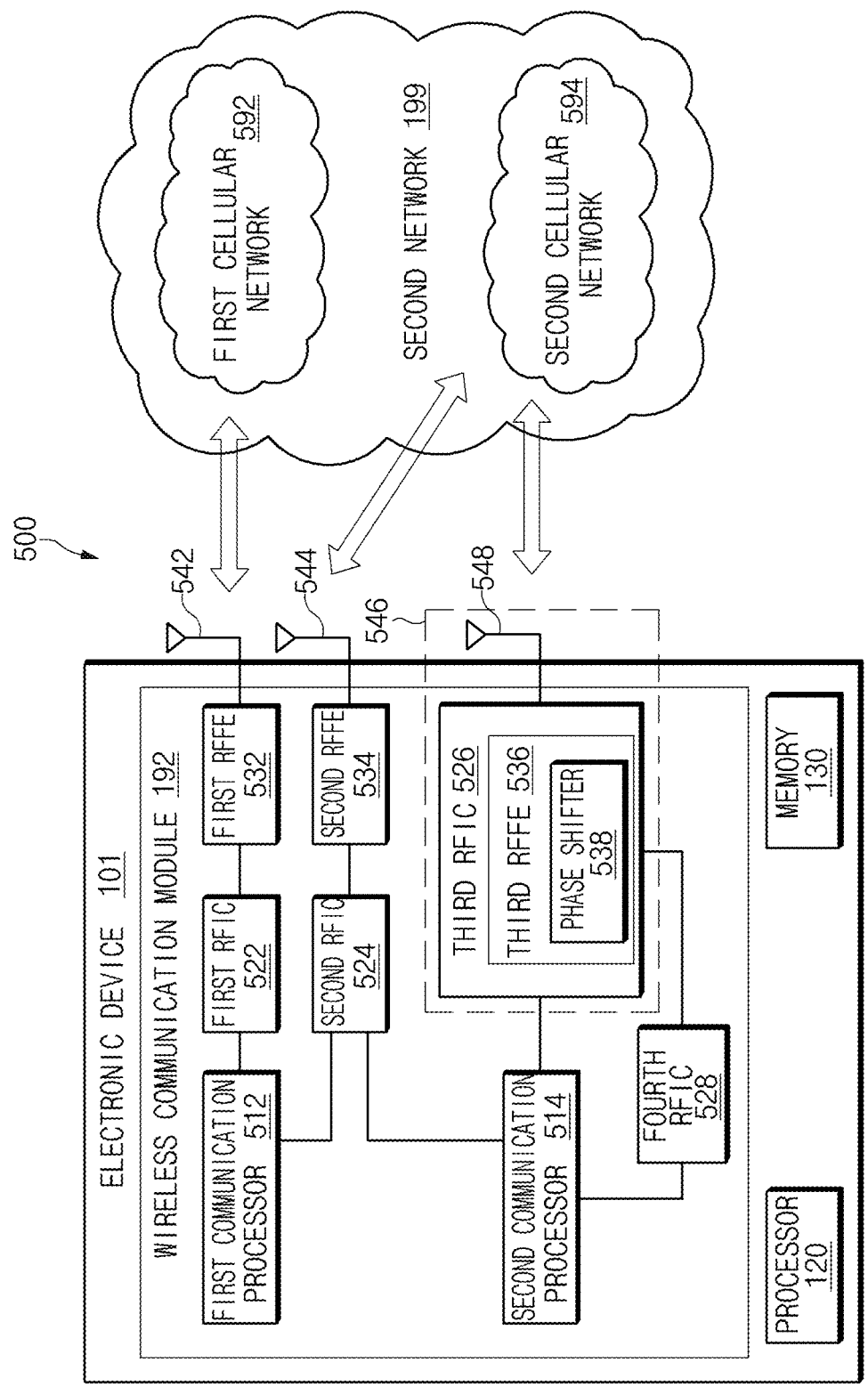
FIG. 5 illustrates a block diagram of an electronic device for supporting legacy network communication and 5G network communication, according to various embodiments.

FIG. 5 illustrates a block diagram 500 of the electronic device 101 for supporting legacy network communication and 5G network communication, according to various embodiments. Referring to FIG. 5, the electronic device 101 may include a first communication processor 512, a second communication processor 514, a first radio frequency integrated circuit (RFIC) 522, a second RFIC 524, a third RFIC 526, a fourth RFIC 528, a first radio frequency front end (RFFE) 532, a second RFFE 534, a first antenna 542, a second antenna 544, and a third antenna 548. The electronic device 101 may further include the processor 120 and the memory 130. The second network 199 may include a first cellular network 592 and a second cellular network 594. According to another embodiment, the electronic device 101 may further include at least one of the components described in FIG. 1, and the second network 199 may include at least one other network. According to an embodiment, the first communication processor 512, the second communication processor 514, the first RFIC 522, the second RFIC 524, the fourth RFIC 528, the first RFFE 532, and the second RFFE 534 may form at least a part of the wireless communication module 192. According to another embodiment, the fourth RFIC 528 may be omitted or may be included as a part of the third RFIC 526.

The first communication processor 512 may establish a communication channel of a band to be used for wireless communication with the first cellular network 592 and may support legacy network communication over the established communication channel. According to various embodiments, the first cellular network 592 may be a legacy network including 2G, 3G, 4G, and/or long term evolution (LTE) network.

The second communication processor 514 may establish a communication channel corresponding to a specified band (e.g., approximately 6 GHz to approximately 60 GHz) of bands to be used for wireless communication with the second cellular network 594 and may support 5th generation (5G) network communication over the established communication channel. According to various embodiments, the second cellular network 594 may be a 5G network defined in the 3GPP.

Additionally, according to an embodiment, the first communication processor 512 or the second communication processor 514 may establish a communication channel corresponding to another specified band (e.g., lower than approximately 6 GHz) of the bands to be used for wireless communication with the second cellular network 594 and may support the 5G network communication over the established communication channel.

According to an embodiment, the first communication processor 512 and the second communication processor 514 may be implemented in a single chip or a single package. According to various embodiments, the first communication processor 512 or the second communication processor 514 may be implemented in a single chip or a single package together with the processor 120, the auxiliary processor 123 of FIG. 1, or the communication module 190 of FIG. 1.

In the case of transmitting a signal, the first RFIC 522 may convert a baseband signal generated by the first communication processor 512 into a radio frequency (RF) signal of approximately 700 MHz to approximately 3 GHz that is used in the first cellular network 592 (e.g., a legacy network). In the case of receiving a signal, an RF signal may be obtained from the first cellular network 592 (e.g., a legacy network) through an antenna (e.g., the first antenna 542) and may be pre-processed through an RFFE (e.g., the first RFFE 532). The first RFIC 522 may convert the pre-processed RF signal into a baseband signal so as to be processed by the first communication processor 512.

In the case of transmitting a signal, the second RFIC 524 may convert a baseband signal generated by the first communication processor 512 or the second communication processor 514 into an RF signal (hereinafter referred to as a "5G Sub6 RF signal") in a Sub6 band (e.g., lower than approximately 6 GHz) used in the second cellular network 594 (e.g., a 5G network). In the case of receiving a signal, a 5G Sub6 RF signal may be obtained from the second cellular network 594 (e.g., a 5G network) through an antenna (e.g., the second antenna 544) and may be pre-processed through an RFFE (e.g., the second RFFE 534). The second RFIC 524 may convert the pre-processed 5G Sub6 RF signal into a baseband signal so as to be processed by a relevant communication processor of the first communication processor 512 or the second communication processor 514.

The third RFIC 526 may convert a baseband signal generated by the second communication processor 514 into an RF signal (hereinafter referred to as a "5G Above6 RF signal") in a 5G Above6 band (e.g., approximately 6 GHz to approximately 60 GHz) to be used in the second cellular network 594 (e.g., a 5G network). In the case of receiving a signal, a 5G Above6 RF signal may be obtained from the second cellular network 594 (e.g., a 5G network) through an antenna (e.g., the third antenna 548) and may be pre-processed through a third RFFE 536. For example, the third RFFE 536 may perform pre-processing of a signal by using a phase shifter 538. The third RFIC 526 may convert the pre-processed 5G Above6 RF signal into a baseband signal so as to be processed by the second communication processor 514. According to an embodiment, the third RFFE 536 may be implemented as a part of the third RFIC 526.

According to an embodiment, the electronic device 101 may include the fourth RFIC 528 independently of the third RFIC 526 or as at least a part of the third RFIC 526. In this case, the fourth RFIC 528 may convert a baseband signal generated by the second communication processor 514 into an RF signal (hereinafter referred to as an "IF signal") in an intermediate frequency band (e.g., approximately 9 GHz to approximately 11 GHz) and may provide the IF signal to the third RFIC 526. The third RFIC 526 may convert the IF signal into the 5G Above6 RF signal. In the case of receiving a signal, a 5G Above6 RF signal may be received from the second cellular network 594 (e.g., a 5G network) through an antenna (e.g., the third antenna 548) and may be converted into an IF signal by the third RFIC 526. The fourth RFIC 528 may convert the IF signal into a baseband signal so as to be processed by the second communication processor 514.

According to an embodiment, the first RFIC 522 and the second RFIC 524 may be implemented with a part of a single package or a single chip. According to an embodiment, the first RFFE 532 and the second RFFE 534 may be implemented with a part of a single package or a single chip. According to an embodiment, at least one antenna of the first antenna 542 or the second antenna 544 may be omitted or may be combined with any other antenna to process RF signals in a plurality of bands.

According to an embodiment, the third RFIC 526 and the third antenna 548 may be disposed on the same substrate to form a third antenna module 546. For example, the wireless communication module 192 or the processor 120 may be disposed on a first substrate (e.g., a main PCB). In this case, the third RFIC 526 may be disposed in a partial region (e.g., on a lower surface) of a second substrate (e.g., a sub PCB) independent of the first substrate, and the third antenna 548 may be disposed in another partial region (e.g., on an upper surface) of the second substrate. As such, the third antenna module 546 may be formed. According to an embodiment, the third antenna 548 may include, for example, an antenna array capable of being used for beamforming. It is possible to reduce a length of a transmission line between the third RFIC 526 and the third antenna 548 by disposing the third RFIC 526 and the third antenna 548 on the same substrate. For example, the decrease in the transmission line may make it possible to prevent a signal in a high-frequency band (e.g., approximately 6 GHz to approximately 60 GHz) used for the 5G network communication from being lost (or attenuated) due to the transmission line. As such, the electronic device 101 may improve the quality or speed of communication with the second cellular network 594 (e.g., a 5G network).

The second cellular network 594 (e.g., a 5G network) may be used independently of the first cellular network 592 (e.g., a legacy network) (e.g., this scheme being called "stand-alone (SA)") or may be used in connection with the first cellular network 592 (e.g., this scheme being called "non-stand alone (NSA)"). For example, an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 512, or the second communication processor 514).

One third antenna module 546 is illustrated in FIG. 5; however, according to an embodiment, the electronic device 101 may include a plurality of third antenna modules 546.

Below, a structure of an antenna module for communication with a 5G network, which is included in an electronic device according to an embodiment, will be described with reference to FIGS. 6 and 7. Components identical to the components of the embodiment described above will be described with reference to the same reference numerals, and the corresponding component may be presented as an example. With regard to components identical to the components of the embodiment described above, additional description will be omitted to avoid redundancy.

Figure 6:
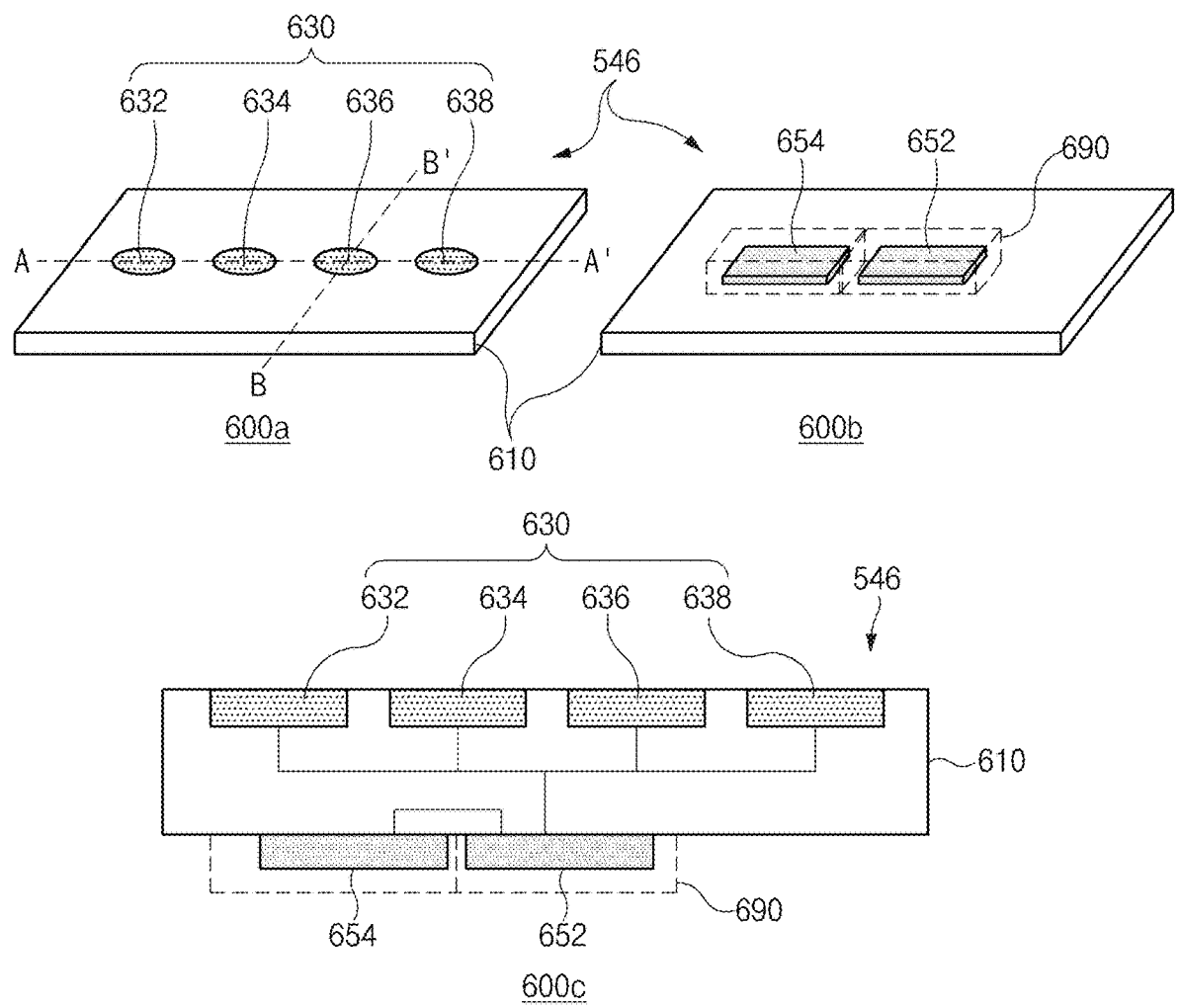
FIG. 6 is a view illustrating a structure of a third antenna module described with reference to FIG. 5.

FIG. 6 illustrates an embodiment of a structure of the third antenna module 546 described with reference to FIG. 5, for example. In FIG. 6, 600*a* is a perspective view of the third antenna module 546 when viewed from one side, and 600*b* is a perspective view of the third antenna module 546 when viewed from another side. In FIG. 6, 600*c* is a cross-sectional view of the third antenna module 546 taken along line A-A'. FIG. 7 illustrates a cross-sectional view of the third antenna module 546 taken along line B-B' of 600*a* of FIG. 6.

Referring to FIG. 6, in an embodiment, the third antenna module 546 may include a printed circuit board 610, an antenna array 630, a radio frequency integrated circuit (RFIC) 652, a power manage integrated circuit (PMIC) 654, and a module interface. Selectively, the third antenna module 546 may further include a shielding member 690. In other embodiments, at least one of the above components may be omitted, or at least two of the above components may be integrally formed.

The printed circuit board 610 may include a plurality of conductive layers and a plurality of non-conductive layers, and the conductive layers and the non-conductive layers may be alternately stacked. The printed circuit board 610 may provide an electrical connection between the printed circuit board 610 and/or various electronic components disposed on the outside by using wires and conductive vias formed in the conductive layers.

The antenna array 630 (e.g., 538 of FIG. 5) may include a plurality of antenna elements 632, 634, 636, and 638 disposed to form a directional beam. The antenna elements 632, 634, 636, and 638 may be formed on a first surface of the printed circuit board 610 as illustrated. According to another embodiment, the antenna array 630 may be formed within the printed circuit board 610 or on one surface of the printed circuit board 610. According to embodiments, the antenna array 630 may include a plurality of antenna arrays (e.g., a dipole antenna array and/or a patch antenna array) that are identical or different in shape or kind.

The RFIC 652 (e.g., the third RFIC 526 of FIG. 2) may be disposed in another region (e.g., a second surface facing away from the first surface) of the printed circuit board 610 so as to be spaced from the antenna array 630. The RFIC 652 may be configured to process a signal in a selected frequency band, which is transmitted/received through the antenna array 630. According to an embodiment, in the case of transmitting a signal, the RFIC 652 may convert a baseband signal obtained from a communication processor into an RF signal in a specified band. In the case of receiving a signal, the RFIC 652 may convert an RF signal received through the antenna array 630 into a baseband signal and may provide the baseband signal to the communication processor.

According to another embodiment, in the case of transmitting a signal, the RFIC 652 may up-convert an IF signal (e.g., approximately 9 GHz to approximately 11 GHz) obtained from an intermediate frequency integrated circuit (IFIC) (e.g., the fourth RFIC 528 of FIG. 5) into an RF signal. In the case of receiving a signal, the RFIC 652 may down-convert an RF signal obtained through the antenna array 630 so as to be converted into an IF signal and may provide the IF signal to the IFIC.

The PMIC 654 may be disposed in another region (e.g., on the second surface) of the printed circuit board 610, which is spaced from the antenna array 630. The PMIC 654 may be supplied with a voltage from a main PCB and may provide a power necessary for various components (e.g., the RFIC 652) on the third antenna module 546.

The shielding member 690 may be disposed at a portion (e.g., on the second surface) of the printed circuit board 610 such that at least one of the RFIC 652 or the PMIC 654 is electromagnetically shielded. According to an embodiment, the shielding member 690 may include a shield can.

In various embodiments, the third antenna module 546 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 652 and/or the PMIC 654 of the third antenna module 546 may be electrically connected with the printed circuit board through the connection member.

Figure 7:
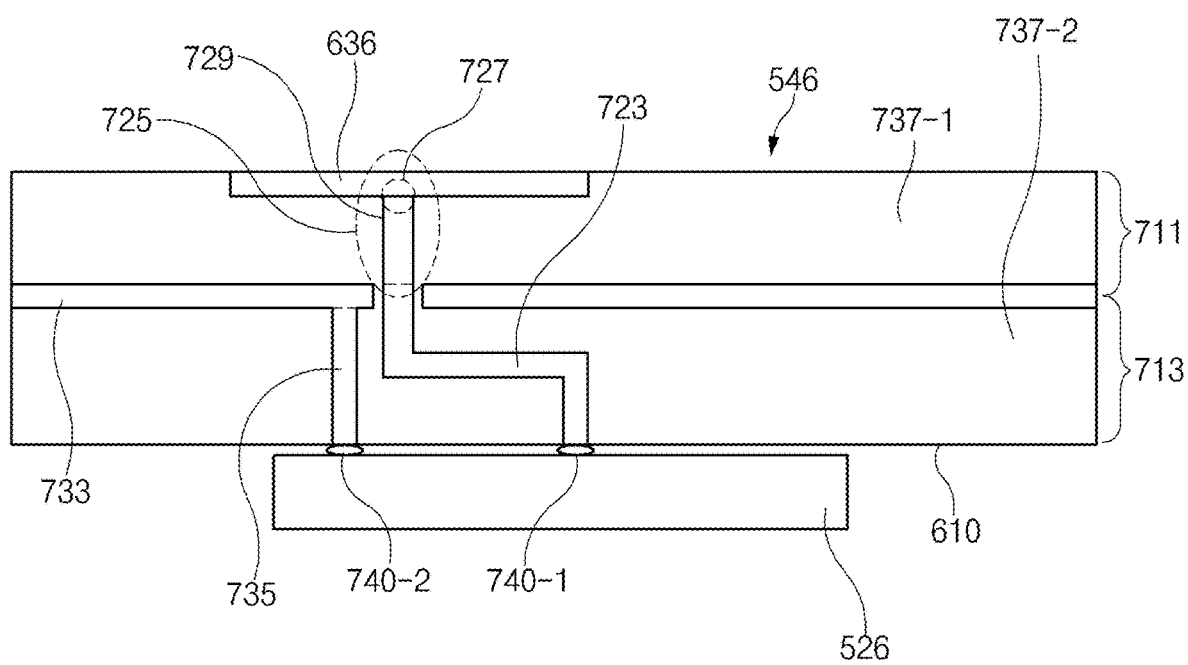
FIG. 7 illustrates a cross-sectional view of a third antenna module taken along line A-A' of FIG. 6.

Referring to FIG. 7, the printed circuit board 610 may include an antenna layer 711 and a network layer 713.

The antenna layer 711 may include at least one dielectric layer 737-1, and an antenna element 636 and/or a feeding part 725 formed on an outer surface of the dielectric layer 737-1 or in the dielectric layer 737-1. The feeding part 725 may include a feeding point 727 and/or a signal line 729.

The network layer 713 may include at least one dielectric layer 737-2; and at least one ground layer 733, at least one conductive via 735, a transmission line 723, and/or a signal line 729 formed on an outer surface of the dielectric layer 737-2 or in the dielectric layer 737-2.

In addition, in the embodiment illustrated, the third RFIC 526 may be electrically connected with the network layer 713, for example, through first and second connection parts (e.g., solder bumps) 740-1 and 740-2. In other embodiments, various connection structures (e.g., soldering or a ball grid array (BGA)) may be utilized instead of the connection parts. The third RFIC 526 may be electrically connected with the antenna element 636 through the first connection part 740-1, the transmission line 723, and the feeding part 725. Also, the third RFIC 526 may be electrically connected with the ground layer 733 through the second connection part 740-2 and the conductive via 735. The third RFIC 526 may also be electrically connected with the above module interface through the signal line 729.

Below, mounting locations of a plurality of antennas included in an electronic device according to an embodiment will be described with reference to FIG. 8. Components identical to the components of the embodiment described above will be described with reference to the same reference numerals, and the corresponding component may be presented as an example. With regard to components identical to the components of the embodiment described above, additional description will be omitted to avoid redundancy.

Figure 8:
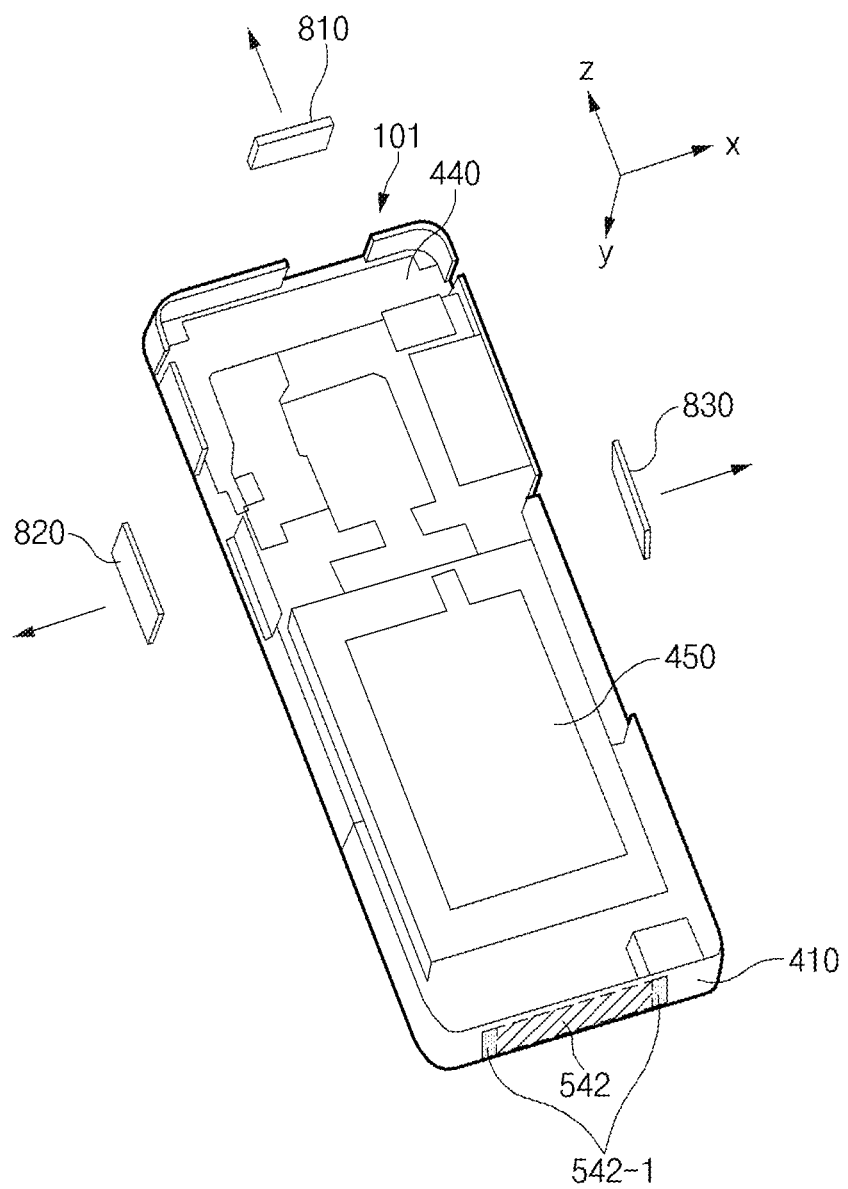
FIG. 8 is a view illustrating how antenna modules are disposed at an electronic device according to an embodiment.

FIG. 8 is a view illustrating how an antenna module is disposed at an electronic device 101, according to an embodiment.

Referring to FIG. 8, according to an embodiment, the electronic device 101 may include a first antenna 542, a 3-1st antenna module 810, a 3-2nd antenna module 820, and/or a 3-3rd antenna module 830. For example, FIG. 8 illustrates the interior of the electronic device 101 when viewed from above a back surface of the electronic device 101. For example, FIG. 8 may illustrate the interior of the electronic device 101 when viewed from above the back surface of the electronic device 101 in one direction (e.g., the negative direction of the Y-axis), after removing a back plate (e.g., the back plate 480 of FIG. 4) and an antenna (e.g., the antenna 470 of FIG. 4) of the electronic device 101. For another example, FIG. 8 may illustrate the interior of the electronic device 101 when viewed from above the back surface of the electronic device 101 in the one direction, after removing the back plate, the antenna, and a second support member (e.g., the second support member 460 of FIG. 4) of the electronic device 101. Below, for convenience of description, a positive direction of the Z-axis is referred to as an "upper end of the electronic device 101", and a positive direction of the X-axis is referred to as a "right side of the electronic device 101"

According to an embodiment, at least a portion of the side bezel structure 410 (e.g., a front metal) may be used as the first antenna 542 (or a radiator) for transmitting/receiving a wireless signal in a first frequency band (e.g., a wireless signal of lower than 6 GHz) that is used for legacy cellular communication (e.g., 2G, 3G, 4G, and/or long term evolution (LTE) mobile communication) (e.g., communication with the first cellular network 592 of FIG. 5). The first antenna 542 may transmit/receive a wireless signal in the first frequency band (e.g., a wireless signal of lower than 6 GHz) based on a first radio access technology (RAT) (e.g., a 2G, 3G, 4G, and/or LTE RAT). For example, a portion of the side bezel structure 410, which corresponds to a lower end of the electronic device 101, may be the first antenna 542. According to an embodiment, an antenna radiator of the first antenna 542 may be implemented by using a portion of a metal bezel of the side bezel structure 410, and segments 542-1 may be at opposite sides of the first antenna 542.

According to an embodiment, the 3-1st antenna module 810 may be placed at an upper end of a back surface of the electronic device 101. For example, the 3-1st antenna module 810 may be placed at the bezel structure 410 of the electronic device 101 or between the printed circuit board 440 and a back plate (e.g., the back plate 480 of FIG. 4). According to an embodiment, the 3-1st antenna module 810 may be placed on one side of the printed circuit board 440, not between the printed circuit board 440 and the back plate, and may be electrically connected with the printed circuit board 440 by using various methods such as a connector or the like.

For example, the 3-1st antenna module 810 may correspond to the third antenna module 546 of FIG. 6. The 3-1st antenna module 810 may transmit/receive a wireless signal in a second frequency band (e.g., a wireless signal of 6 GHz or higher) based on a second RAT (e.g., a new radio (NR) RAT).

According to an embodiment, the 3-1st antenna module 810 may include a plurality of antenna elements (e.g., the plurality of antenna elements 632, 634, 636, and 638 of FIG. 6). For example, the 3-1st antenna module 810 may be disposed within the electronic device 101 such that the plurality of antenna elements form a beam in the positive direction of the Z-axis.

The 3-2nd antenna module 820 may be placed, for example, on a left side of the back surface of the electronic device 101. For example, the 3-2nd antenna module 820 may be placed adjacent to a left surface of the bezel structure 410 when viewed from above the back surface of the electronic device 101.

According to various embodiments, the 3-2nd antenna module 820 may correspond to the third antenna module 546 of FIG. 6. The 3-2nd antenna module 820 may transmit/receive a wireless signal in the second frequency band (e.g., a wireless signal of 6 GHz or higher) based on the second RAT (e.g., an NR RAT).

According to an embodiment, the 3-2nd antenna module 820 may include a plurality of antenna elements (e.g., the plurality of antenna elements 632, 634, 636, and 638 of FIG. 6). For example, the 3-2nd antenna module 820 may be disposed within the electronic device 101 such that the plurality of antenna elements form a beam in a negative direction of the X-axis.

According to various embodiments, the 3-3rd antenna module 830 may be placed on a right side of the back surface of the electronic device 101. For example, the 3-3rd antenna module 830 may be placed adjacent to a right surface of the bezel structure 410 when viewed from above the back surface of the electronic device 101.

According to various embodiments, the 3-3rd antenna module 830 may correspond to the third antenna module 546 of FIG. 6. The 3-3rd antenna module 830 may transmit/receive a wireless signal in the second frequency band (e.g., a wireless signal of 6 GHz or higher) based on the second RAT (e.g., an NR RAT).

According to an embodiment, the 3-3rd antenna module 830 may include a plurality of antenna elements (e.g., the plurality of antenna elements 632, 634, 636, and 638 of FIG. 6). For example, the 3-3rd antenna module 830 may be disposed within the electronic device 101 such that the plurality of antenna elements form a beam in the positive direction of the X-axis.

The placement of the antenna modules described with reference to FIG. 8 is exemplary, and embodiments of the disclosure are not limited thereto. For example, the number of antenna modules may be 2 or more, and locations of antenna modules are not limited to the example of FIG. 8.

Below, components included in an electronic device according to an embodiment will be described with reference to FIG. 9. Components identical to the components of the embodiment described above will be described with reference to the same reference numerals, and the corresponding component may be presented as an example. With regard to components identical to the components of the embodiment described above, additional description will be omitted to avoid redundancy.

Figure 9:
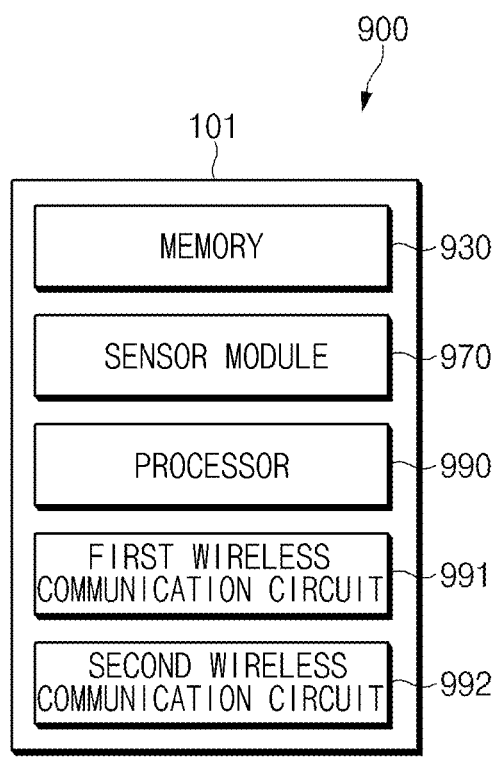
FIG. 9 illustrates a block diagram of an electronic device according to an embodiment.

FIG. 9 illustrates a block diagram 900 of the electronic device 101, according to an embodiment.

According to various embodiments, the electronic device 101 may include a memory 930 (e.g., the memory 130 of FIG. 1), a sensor module 970 (e.g., the sensor module 176 of FIG. 1), a processor 990, a first wireless communication circuit 991 (e.g., the first RFIC 522 and/or the first RFFE 532 of FIG. 5), and/or a second wireless communication circuit 992 (e.g., the second RFIC 524, the third RFIC 526, the second RFFE 534, the third RFFE 536, the phase shifter 538, and/or the fourth RFIC 528). The processor 990 may correspond to the processor 120 of FIG. 1 or may include the processor 120 of FIG. 1, the first communication processor 512 of FIG. 5, and/or the second communication processor 514 of FIG. 5.

For example, the components of the electronic device 101 may be placed within a housing (e.g., the housing 210 of FIG. 2) or on the housing. The memory 930, the sensor module 970, the first wireless communication circuit 991, and the second wireless communication circuit 992 may be operatively connected with the processor 990. The configuration of the electronic device 101 illustrated in FIG. 9 is exemplary, and embodiments of the disclosure are not limited thereto. For example, the electronic device 101 may further include a component not illustrated in FIG. 9. For another example, the electronic device 101 may not include at least a part of the components illustrated in FIG. 9.

According to various embodiments, the memory 930 may store one or more instructions that, when executed, cause the processor 990 to perform an operation of the electronic device 101 or the processor 990 to be described later. According to various embodiments, the memory 930 may be a component that is placed outside the processor 990 and is independent of the processor 990. According to various embodiments, the memory 930 may be implemented within the processor 990 or may be implemented with one chip together with the processor 990.

According to various embodiments, the sensor module 970 may include one or more sensors. For example, the sensor module 970 may include a grip sensor for sensing a grip on the electronic device 101.

For example, the sensor module 970 may include a proximity sensor for detecting an object placed adjacent to the electronic device 101. According to an embodiment, the sensor module 970 may be operatively connected with the processor 990. For example, the processor 990 may receive sensed data directly from the sensor module 970.

According to various embodiments, the processor 990 may include at least one communication processor. For example, the processor 990 may include a first communication processor configured to perform communication based on the first RAT (e.g., a 2G RAT, a 3G RAT, a 4G RAT, and/or an LTE RAT) and a second communication processor configured to perform communication based on the second RAT (e.g., an NR RAT). For another example, the processor 990 may include one communication processor configured to perform communication based on the first RAT and the second RAT. The processor 990 may be operatively connected with the first wireless communication circuit 991 and the second wireless communication circuit 992 and may be configured to control the first wireless communication circuit 991 and the second wireless communication circuit 992.

According to various embodiments, the first wireless communication circuit 991 may be configured to provide communication based on the first RAT. For example, the first wireless communication circuit 991 may be configured to transmit/receive a signal in the first frequency band (e.g., lower than 6 GHz). For example, the first wireless communication circuit 991 may transmit/receive a wireless signal by using at least one antenna (e.g., the first antenna 542 of FIG. 5 and/or FIG. 8) configured to transmit/receive a signal in the first frequency band based on the first RAT. According to an embodiment, at least a portion of a side member of the electronic device 101 (e.g., the first antenna 542 included in a portion of the side member 410 of FIG. 8, which corresponds to a lower end of the electronic device 101) may be used as at least one antenna configured to transmit/receive a signal in the first frequency band.

According to various embodiments, the second wireless communication circuit 992 may be configured to provide communication based on the second RAT. For example, the second wireless communication circuit 992 may be configured to transmit/receive a signal in a frequency band of 3 GHz or higher. According to an embodiment, the second wireless communication circuit 992 may be configured to transmit/receive a signal in the second frequency band (e.g., 6 GHz or higher). For example, the second wireless communication circuit 992 may transmit/receive a wireless signal by using at least one antenna (e.g., the 3-1st antenna module 810, the 3-2nd antenna module 820, and/or the 3-3rd antenna module 830 of FIG. 8) configured to transmit/receive a signal in the second frequency band based on the second RAT. According to an embodiment, the second wireless communication circuit 992 may be configured to transmit/receive a signal in the first frequency band (e.g., lower than 6 GHz). For example, the second wireless communication circuit 992 may transmit/receive a wireless signal by using at least one antenna (e.g., the first antenna 542 of FIG. 5 and/or the second antenna 544 of FIG. 5 (or the first antenna 542 of FIG. 8)) configured to transmit/receive a signal in the first frequency band (e.g., lower than 6 GHz) based on the second RAT.

According to various embodiments, the processor 990 may detect an external object of the electronic device 101 and may control the first wireless communication circuit 991 and/or the second wireless communication circuit 992 based on the detection of the external object. For example, the processor 990 may control the first wireless communication circuit 991 and/or the second wireless communication circuit 992 based on a distance and/or a type of the external object.

According to an embodiment, the processor 990 may detect an object placed within a given distance from the electronic device 101 by using the sensor module 970 and/or the first wireless communication circuit 991. For example, the processor 990 may detect an object by using the grip sensor and/or the proximity sensor of the sensor module 970. For another example, the processor 990 may detect an object by using the first wireless communication circuit 991. In this case, the processor 990 may transmit a signal in the first frequency band by using the first wireless communication circuit 991 and may receive a reflection signal of the transmitted signal by using a feedback reception path of the first wireless communication circuit 991. The processor 990 may detect a short-range object based on magnitudes and phases of the transmission signal and the reflection signal.

According to an embodiment, the sensor module 970 may include a plurality of grip sensors. For example, the sensor module 970 may include a grip sensor for sensing a grip on an antenna for communication based on the first RAT and a grip sensor for sensing a grip on an antenna for communication based on the second RAT. According to an embodiment, in the case where the antenna for communication based on the first RAT is provided in plurality, a plurality of grip sensors may be included in the sensor module 970 for the purpose of sensing a grip on each antenna. According to an embodiment, in the case where the antenna for communication based on the second RAT is provided in plurality, a plurality of grip sensors may be included in the sensor module 970 for the purpose of sensing a grip on each antenna.

According to an embodiment, the processor 990 may detect an external object by using the second wireless communication circuit 992. For example, the processor 990 may detect an object placed within a given distance from the electronic device 101 by using the second wireless communication circuit 992. For another example, the processor 990 may detect a short-range object or a far-range object by using the second wireless communication circuit 992. The processor 990 may transmit a signal in the second frequency band by using the second wireless communication circuit 992 and may measure a reflection signal of the transmission signal to detect the external object. For example, the processor 990 may compare magnitudes and phases of the transmission signal and the reflection signal to identify a distance of the external object and/or a type of the external object (e.g., a metal material, a non-metal material, and/or a human body). According to an embodiment, the processor 990 may check the magnitudes and phases of the transmission signal and the reflection signal and may identify a type of the external object by using a value stored in the memory 930. For example, the memory 930 may include mapping information about magnitudes and phases of the transmission and reflection signals and a type of an external object. According to an embodiment, the processor 990 may identify a difference between a time to transmit the transmission signal and a time to receive the reflection signal and may determine a distance based on the identified difference. For example, the processor 990 may identify a difference between the transmission time and the reception time based on a phase difference of the transmission signal and the reception signal.

Below, an operation of an electronic device according to an embodiment will be described with reference to FIGS. 5 and 8 to 13.

FIGS. 10 to 13 are flowcharts 1000, 1100, 1200, and 1300 indicating operations of an electronic device according to an embodiment.

Operations of FIGS. 10 to 13 may be performed by an electronic device or a processor of the electronic device (e.g., the electronic device 101 or the processor 120 of FIG. 1). With regard to components identical to the components of the embodiment described above, additional description will be omitted to avoid redundancy.

Referring to FIGS. 5, 8, 9, and 10, when the electronic device 101 is connected with the second network 199 (e.g., a far-range wireless communication network) (1010), the electronic device 101 may determine whether the third antenna module 546 of the electronic device 101 operates (1020). The electronic device 101 may determine whether the third antenna module 546 and the first antenna 542 operate at the same time or the first antenna 542 operates solely. The case where the electronic device 101 is connected with the second network 199 (1010) and the third antenna module 546 does not operate may mean that the first antenna 542 of the electronic device 101 operates solely. The electronic device 101 may distinguish the case where the third antenna module 546 and the first antenna 542 operate at the same time and the case where the first antenna 542 operates solely and may determine a signal output power of the first antenna 542 through separate processes.

According to an embodiment, that the third antenna module 546 operates may mean that the processor 990 controls the second wireless communication circuit 992 to transmit or receive a signal through the third antenna 548. According to an embodiment, that the third antenna module 546 operates may mean that the electronic device 101 communicates with the second cellular network 594 (e.g., a 5G network) by using the third antenna module 546. According to an embodiment, that the third antenna module 546 operates may mean a state where the electronic device 101 transmits or receives an RF signal in the second frequency band (e.g., approximately 6 GHz to approximately 60 GHz) through the second cellular network 594 (e.g., a 5G network) by using the third antenna module 546. According to an embodiment, that the third antenna module 546 operates may mean a state where the electronic device 101 transmits or receives a signal in the second frequency band based on the second RAT (e.g., an NR RAT) through the third antenna module 546.

That the third antenna module 546 and the first antenna 542 operate at the same time may be a state where the third antenna module 546 transmits or receive a signal and the first antenna 542 transmits or receives a signal. In the case of a non-stand alone (NSA) technology that the 3GPP defines, for the 5G communication, the electronic device 101 may be simultaneously connected with a first base station based on the first RAT (e.g., an LTE RAT) and a second base station based on the second RAT (e.g., an NR RAT). In this case, the first antenna 542 performing communication based on the first RAT may be connected with the first base station, and the third antenna module 546 performing communication based on the second RAT may be connected with the second base station. A state where the electronic device 101 is connected with the first base station based on the first RAT and is simultaneously connected with the second base station based on the second RAT may mean a E-UTRA new radio dual connectivity (EN-DC).

The case where the electronic device 101 is connected with the second network 199 (1010) and the third antenna module 546 does not operate (1020) may mean that the first antenna 542 of the electronic device 101 operates. That the first antenna 542 of the electronic device 101 operates may mean a state where the processor 990 controls the first wireless communication circuit 991 to perform communication based on the first RAT (e.g., a 2G RAT, a 3G RAT, a 4G RAT, and/or an LTE RAT) through the first antenna 542.

When the third antenna module 546 of the electronic device 101 does not operate, the electronic device 101 may determine whether a hotspot or tethering function of the electronic device 101 is activated (1030).

When the hotspot or tethering of the electronic device 101 is deactivated, the electronic device 101 may determine whether a short-range object is sensed by using the proximity sensor of the electronic device 101 (1040). According to an embodiment, the electronic device 101 may sense the case where a user puts a portion of his/her body closely to the electronic device 101 for call, by using the proximity sensor. Here, the proximity sensor may be a proximity sensor placed in the vicinity of the first antenna 542.

When a short-range object is not sensed by the proximity sensor, the electronic device 101 may determine whether a grip on the first antenna 542 is sensed by using a first grip sensor of the electronic device 101 (1050). The first grip sensor may sense a grip on the first antenna 542 and may be placed adjacent to the first antenna 542 to sense a grip on the first antenna 542.

When a grip on the first antenna 542 is not sensed (1050), the electronic device 101 may determine whether an external electronic device (e.g., an earphone) is connected to a connector hole (e.g., the second connector hole 209 of FIG. 2) (1060).

When an external electronic device is not connected, the electronic device 101 may output a signal of A dBm through the first antenna 542 (1070). For example, A dBm may be a value at which electromagnetic waves of the electronic device 101 satisfy a reference for the specific absorption rate (SAR) being an index indicating the SAR for the body.

When the third antenna module 546 of the electronic device 101 does not operate (1020) and the hotspot or tethering of the electronic device 101 is activated (1030), the electronic device 101 may allow a signal output through the first antenna 542 to back off as much as W dB (1031). The backoff operation may mean an operation of reducing a gain value of a signal sent by an antenna. That is, to perform the power backoff on the first antenna 542 as much as of W dB may mean to reduce a gain value of a signal sent by the first antenna 542 as much as W dB. That is, when the third antenna module 546 of the electronic device 101 does not operate (1020) and the hotspot or tethering of the electronic device 101 is activated (1030), the electronic device 101 may output a signal of "A dBm-W dB" through the first antenna 542 (1031). For example, W dB may be a value at which electromagnetic waves of the electronic device 101 satisfy the reference for the SAR when performing the power backoff of W dB on the first antenna 542.

When the third antenna module 546 of the electronic device 101 does not operate (1020), the hotspot or tethering of the electronic device 101 is not activated (1030), and a short-range object is sensed by the proximity sensor (1040), the electronic device 101 may allow a signal output through the first antenna 542 to back off as much as Z dB (1041). That is, when the third antenna module 546 of the electronic device 101 does not operate (1020), the hotspot or tethering of the electronic device 101 is not activated (1030), and a short-range object is sensed by the proximity sensor (1040), the electronic device 101 may output a signal of "A dBm-Z dB" through the first antenna 542 (1041). For example, Z dB may be a value at which electromagnetic waves of the electronic device 101 satisfy the reference for the SAR when performing the power backoff of Z dB on the first antenna 542.

When the third antenna module 546 of the electronic device 101 does not operate (1020), the hotspot or tethering of the electronic device 101 is not activated (1030), a short-range object is not sensed by the proximity sensor (1040), and a grip on the first antenna 542 is sensed by the first grip sensor (1050), the electronic device 101 may allow a signal output through the first antenna 542 to back off as much as Y dB (1051). That is, when the third antenna module 546 of the electronic device 101 does not operate (1020), the hotspot or tethering of the electronic device 101 is not activated (1030), a short-range object is not sensed by the proximity sensor (1040), and a grip on the first antenna 542 is sensed by the first grip sensor (1050), the electronic device 101 may output a signal of "A dBm-Y dB" through the first antenna 542 (1051). For example, Y dB may be a value at which electromagnetic waves of the electronic device 101 satisfy the reference for the SAR when performing the power backoff of Y dB on the first antenna 542.

When the third antenna module 546 of the electronic device 101 does not operate (1020), the hotspot or tethering of the electronic device 101 is not activated (1030), a short-range object is not sensed by the proximity sensor (1040), a grip on the first antenna 542 is not sensed by the first grip sensor (1050), and an external electronic device is connected (1060), the electronic device 101 may allow a signal output through the first antenna 542 to back off as much as X dB (1061). That is, when the third antenna module 546 of the electronic device 101 does not operate (1020), the hotspot or tethering of the electronic device 101 is not activated (1030), a short-range object is not sensed by the proximity sensor (1040), a grip on the first antenna 542 is not sensed by the first grip sensor (1050), and an external electronic device is connected (1060), the electronic device 101 may output a signal of "A dBm-X dB" through the first antenna 542 (1061). For example, X dB may be a value at which electromagnetic waves of the electronic device 101 satisfy the reference for the SAR when performing the power backoff of X dB on the first antenna 542.

Figure 10:
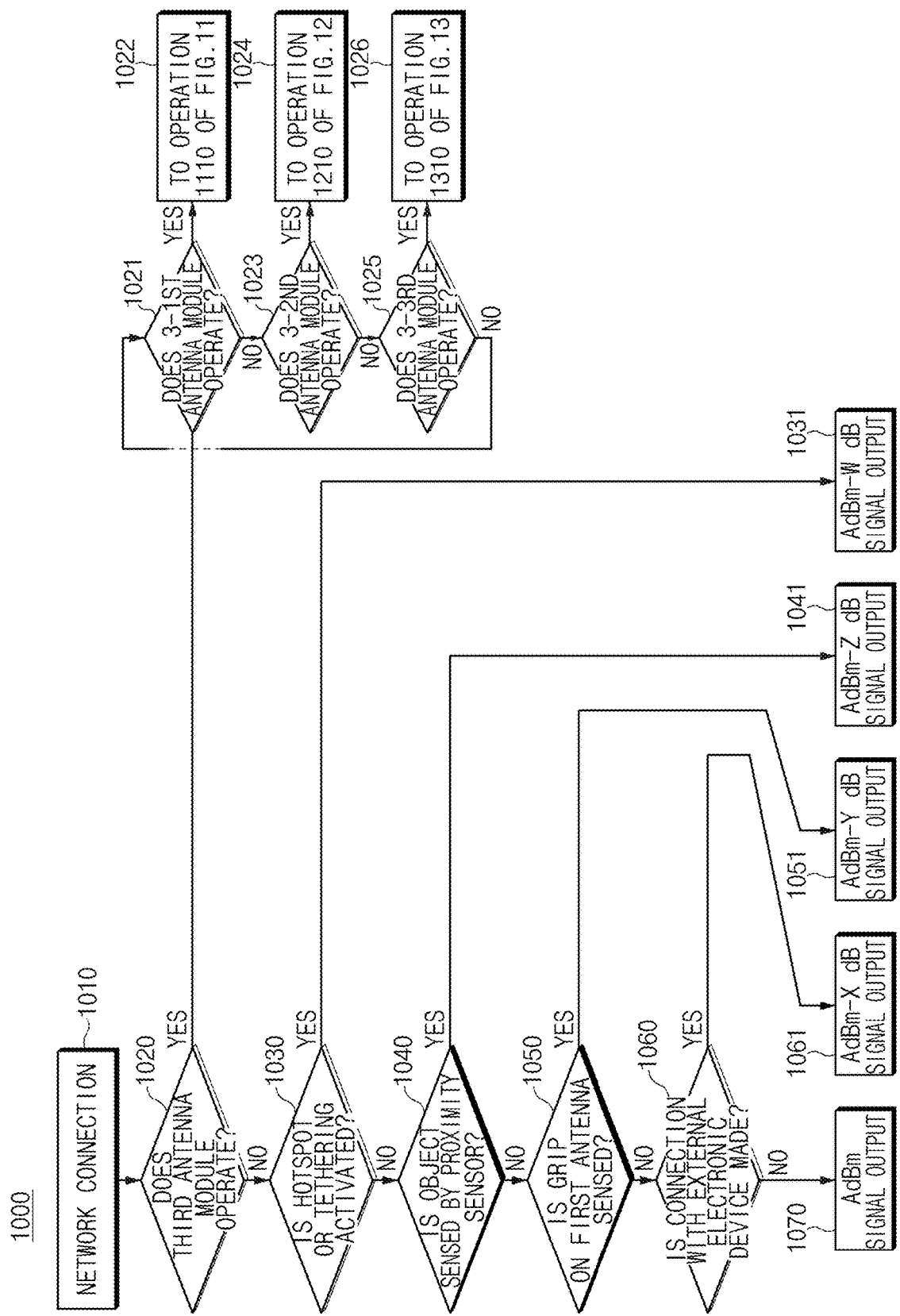
FIG. 10 is a flowchart illustrating an operation of an electronic device according to an embodiment.

An example is illustrated in FIG. 10 as when the hotspot or tethering of the electronic device 101 is not activated (1030), whether a short-range object is sensed by the proximity sensor is determined (1040), but this is only one embodiment. For example, to determine whether the hotspot or tethering of the electronic device 101 is activated (1030) and to determine whether a short-range object is sensed by the proximity sensor (1040) may be independent of each other. According to an embodiment, even when the hotspot or tethering of the electronic device 101 is activated (1030), whether a short-range object is sensed by the proximity sensor may be determined (1040). In this case, the electronic device 101 may determine a backoff value (dB) in consideration of a state where the hotspot or tethering is activated and a state where a short-range object is sensed by the proximity sensor together.

An example is illustrated in FIG. 10 as when the hotspot or tethering of the electronic device 101 is not activated (1030) and a short-range object is not sensed by the proximity sensor (1040), whether a grip on the first antenna 542 is sensed by the first grip sensor is determined (1050), but this is only one embodiment. For example, to determine whether the hotspot or tethering of the electronic device 101 is activated (1030), to determine whether a short-range object is sensed by the proximity sensor (1040), and to determine whether a grip on the first antenna 542 is sensed by the first grip sensor (1050) may be independent of each other. Even when the hotspot or tethering is activated (1030) and a short-range object is sensed by the proximity sensor (1040), whether a grip on the first antenna 542 is sensed by the first grip sensor may be determined (1050). In this case, the electronic device 101 may determine a backoff value (dB) in consideration of a state where the hotspot or tethering is activated, a state where a short-range object is sensed by the proximity sensor, and a state where a grip on the first antenna 542 is sensed by the first grip sensor (1050) together. Also, according to an embodiment, even when the hotspot or tethering is activated (1030) and a short-range object is not sensed by the proximity sensor (1040), whether a grip on the first antenna 542 is sensed by the first grip sensor may be determined (1050), and the electronic device 101 may determine a backoff value in consideration of the corresponding state. Also, according to an embodiment, even when the hotspot or tethering is not activated (1030) and a short-range object is sensed by the proximity sensor (1040), whether a grip on the first antenna 542 is sensed by the first grip sensor may be determined (1050), and the electronic device 101 may determine a backoff value in consideration of the corresponding state.

An example is illustrated in FIG. 10 as when the hotspot or tethering of the electronic device 101 is not activated (1030), a short-range object is not sensed by the proximity sensor (1040), and a grip on the first antenna 542 is not sensed by the first grip sensor is determined (1050), whether an external electronic device is connected with the electronic device 101 may be determined (1060), but this is only one embodiment. For example, to determine whether the hotspot or tethering is activated (1030), to determine whether a short-range object is sensed by the proximity sensor (1040), to determine whether a grip on the first antenna 542 is sensed by the first grip sensor (1050), and to determine whether an external electronic device is connected with the electronic device 101 (1060) may be independent of each other. The electronic device 101 may independently determine whether the hotspot or tethering is activated (1030), whether a short-range object is sensed by the proximity sensor (1040), whether a grip on the first antenna 542 is sensed by the first grip sensor (1050), and whether an external electronic device is connected with the electronic device 101 (1060) and may determine a backoff value in consideration of the corresponding state.

Referring again to FIGS. 5, 8, 9, and 10, when a result of determining whether the third antenna module 546 of the electronic device 101 operates (1020) indicates that the third antenna module 546 operates, the electronic device 101 may determine whether a 3-1st antenna module (e.g., the 3-1st antenna module 810 of FIG. 8) included in the third antenna module 546 operates (1021). The meaning of the operation of the 3-1st antenna module may be identical to the above description associated with the operation of the third antenna module 546.

Each of the 3-1st antenna module 810, the 3-2nd antenna module 820, and the 3-3rd antenna module 830 that are antenna modules transmitting/receiving signals based on the second RAT (e.g., an NR RAT) may include a plurality of antenna elements arranged to form a directional beam. Accordingly, the 3-1st antenna module 810, the 3-2nd antenna module 820, and the 3-3rd antenna module 830 may radiate electromagnetic waves by using a beam forming technology so as to be focused at a specific point.

When the 3-1st antenna module 810, the 3-2nd antenna module 820, or the 3-3rd antenna module 830 and the first antenna 542 transmitting/receiving a signal based on the first RAT (e.g., a 2G RAT, a 3G RAT, a 4G RAT, and/or an LTE RAT) simultaneously operate, an overlapping region where electromagnetic waves radiated from the 3-1st antenna module 810, the 3-2nd antenna module 820, or the 3-3rd antenna module 830 overlap electromagnetic waves radiates from the first antenna 542 on a beam radiation pattern may occur. Accordingly, when the 3-1st antenna module 810, the 3-2nd antenna module 820, or the 3-3rd antenna module 830 and the first antenna 542 simultaneously operate, an environment where the user is exposed to electromagnetic waves may change, and it may be necessary to consider a change of the electromagnetic wave exposure environment for the purpose of satisfying the SAR standard in which electromagnetic waves (thermal energy) absorbed per unit mass by a human body are used as a determination reference. Below, the degree to which an electromagnetic wave exposure environment is changed by a simultaneous operation of the 3-1st antenna module 810, the 3-2nd antenna module 820, or the 3-3rd antenna module 830 and the first antenna 542 may be referred to as the "degree of influence on the SAR".

When the 3-1st antenna module 810, the 3-2nd antenna module 820, or the 3-3rd antenna module 830 and the first antenna 542 simultaneously operate, as a distance between the 3-1st antenna module 810, the 3-2nd antenna module 820, or the 3-3rd antenna module 830 and the first antenna 542 decreases, the degree to which radiated electromagnetic waves overlap each other may increase. For this reason, as the distance decreases, the degree of influence on the SAR may increase in terms of an electromagnetic wave exposure.

Referring to FIG. 8, because the 3-1st antenna module 810 is placed at an upper end of an electronic device, a distance between the 3-1st antenna module 810 and the first antenna 542 placed at a portion of the side bezel structure 410, which corresponds to a lower end of the electronic device, may be relatively greater than a distance between the 3-2nd antenna module 820 or the 3-3rd antenna module 830 and the first antenna 542. Accordingly, when the 3-1st antenna module 810 and the first antenna 542 simultaneously operate, the degree to which electromagnetic waves radiated from the 3-1st antenna module 810 and the first antenna 542 overlap may be relatively low, and thus, the degree of influence on the SAR may be relatively low in terms of the electromagnetic wave exposure. In determining a power backoff value of an antenna or an antenna module, in the case where there is a change of an environment where the user is exposed to electromagnetic waves simultaneously radiated from the antenna and the antenna module as the electromagnetic waves overlap, this influence may be applied to determine a backoff value.

Figure 11:
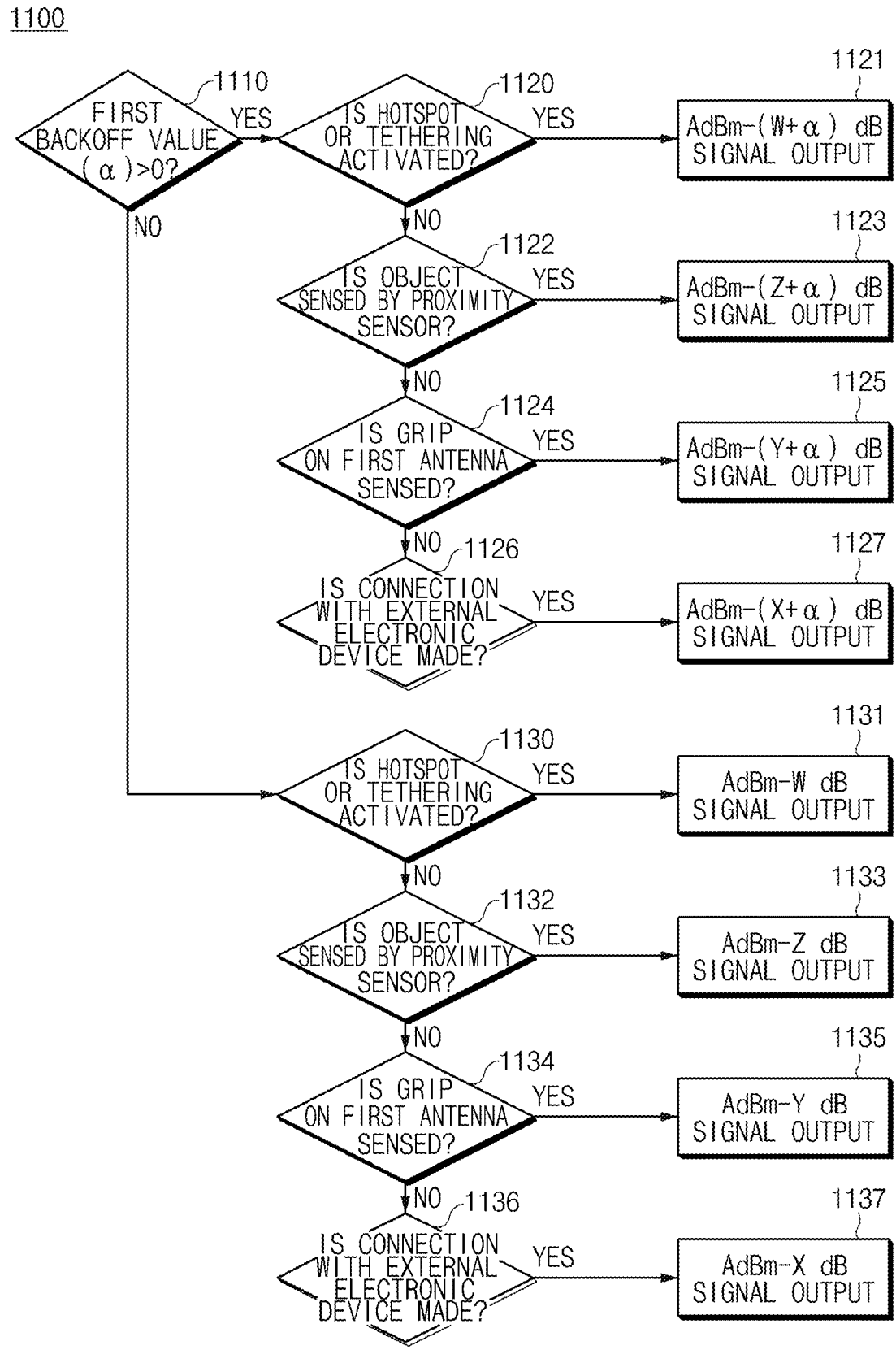
FIG. 11 is a flowchart illustrating an operation of an electronic device according to an embodiment.

When it is determined that the 3-1st antenna module 810 operates (1021), the electronic device 101 may proceed to operation 1110 of the flowchart 1100 of FIG. 11 (1022). An operation of the electronic device 101 when the 3-1st antenna module 810 operates will be described with reference to FIG. 11 later.

When it is determined that the 3-1st antenna module 810 does not operates (1021), the electronic device 101 may determine whether a 3-2nd antenna module (e.g., the 3-2nd antenna module 820 of FIG. 8) included in the third antenna module 546 operates (1023). The meaning of the operation of the 3-2nd antenna module may be identical to the above description associated with the operation of the third antenna module 546.

Referring to FIG. 8, because the 3-2nd antenna module 820 is placed adjacent to a portion of the side bezel structure 410, which corresponds to a left surface of the electronic device, a relative distance of the 3-2nd antenna module 820 to the first antenna 542 placed adjacent to the portion of the side bezel structure 410, which corresponds to the lower end of the electronic device, may be relatively close compared to the distance between the 3-1st antenna module 810 and the first antenna 542. Accordingly, when the 3-2nd antenna module 820 and the first antenna 542 simultaneously operate, the degree to which electromagnetic waves radiated from the 3-2nd antenna module 820 and the first antenna 542 overlap may be relatively high, and thus, the degree of influence on the SAR may be relatively high in terms of the electromagnetic wave exposure.

Figure 12:
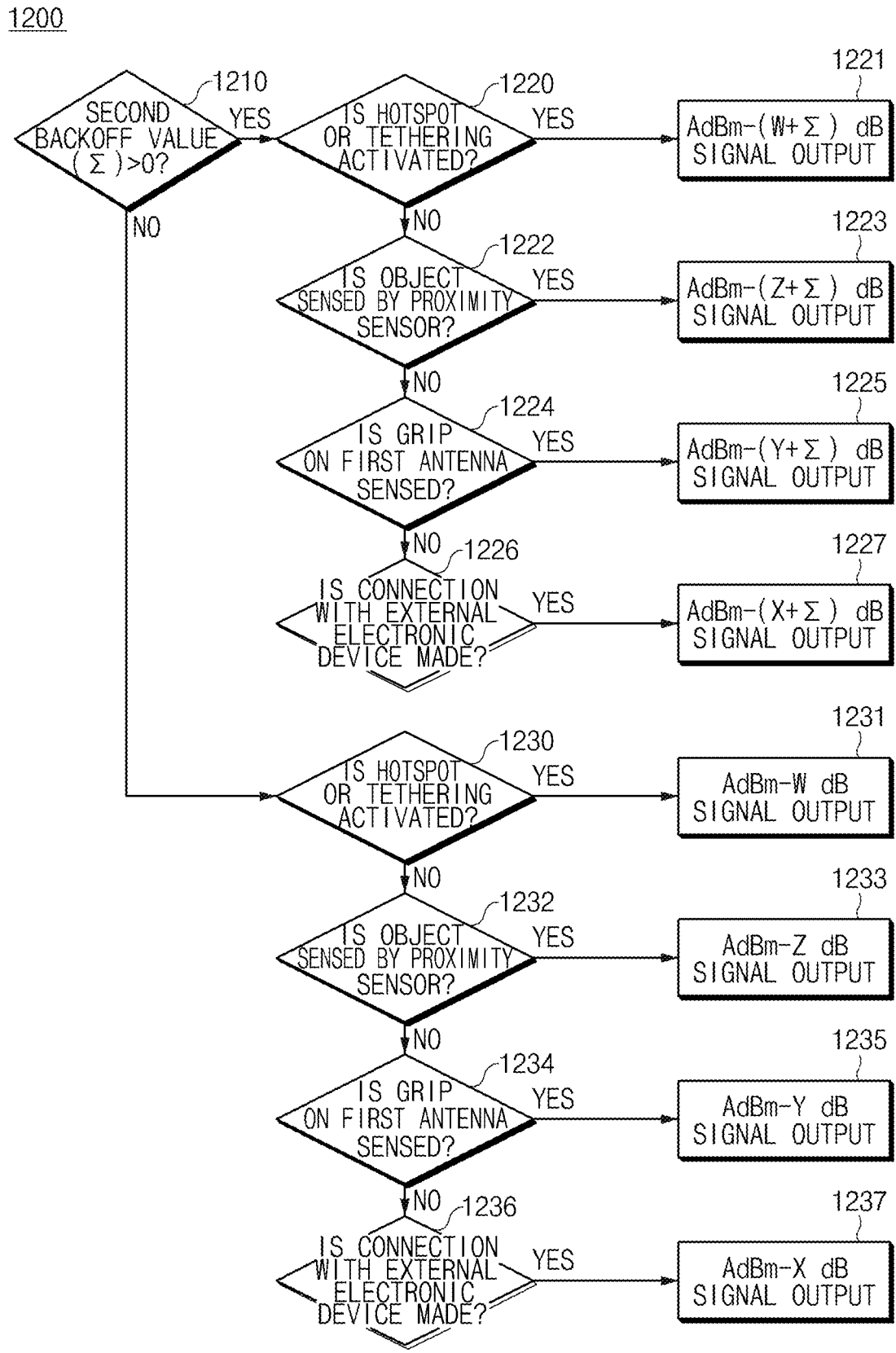
FIG. 12 is a flowchart illustrating an operation of an electronic device according to an embodiment.

When it is determined that the 3-2nd antenna module 820 operates (1023), the electronic device 101 may proceed to operation 1210 of the flowchart 1200 of FIG. 12 (1024). An operation of the electronic device 101 when the 3-2nd antenna module 820 operates will be described with reference to FIG. 12 later.

When it is determined that the 3-2nd antenna module 820 does not operates (1023), the electronic device 101 may determine whether a 3-3rd antenna module (e.g., the 3-3rd antenna module 830 of FIG. 8) included in the third antenna module 546 operates (1025). The meaning of the operation of the 3-3rd antenna module may be identical to the above description associated with the operation of the third antenna module 546.

Referring to FIG. 8, because the 3-3rd antenna module 830 is placed adjacent to a portion of the side bezel structure 410, which corresponds to a right surface of the electronic device, a relative distance of the 3-3rd antenna module 830 to the first antenna 542 placed adjacent to the portion of the side bezel structure 410, which corresponds to the lower end of the electronic device, may be relatively close compared to the distance between the 3-1st antenna module 810 and the first antenna 542. Accordingly, when the 3-3rd antenna module 830 and the first antenna 542 simultaneously operate, the degree to which electromagnetic waves radiated from the 3-3rd antenna module 830 and the first antenna 542 overlap may be relatively high, and thus, the degree of influence on the SAR may be relatively high in terms of the electromagnetic wave exposure. Because a distance between the 3-3rd antenna module 830 and the first antenna 542 is similar to a distance between the 3-2nd antenna module 820 and the first antenna 542, the degree of influence of the 3-3rd antenna module 830 and the first antenna 542 on the SAR may be similar to the degree of influence of the 3-2nd antenna module 820 and the first antenna 542 on the SAR. However, a mounting location of an antenna module is not limited to FIG. 8; in the case where a mounting location changes according to an embodiment, the degree of influence of the antenna module on the SAR may change.

Figure 13:
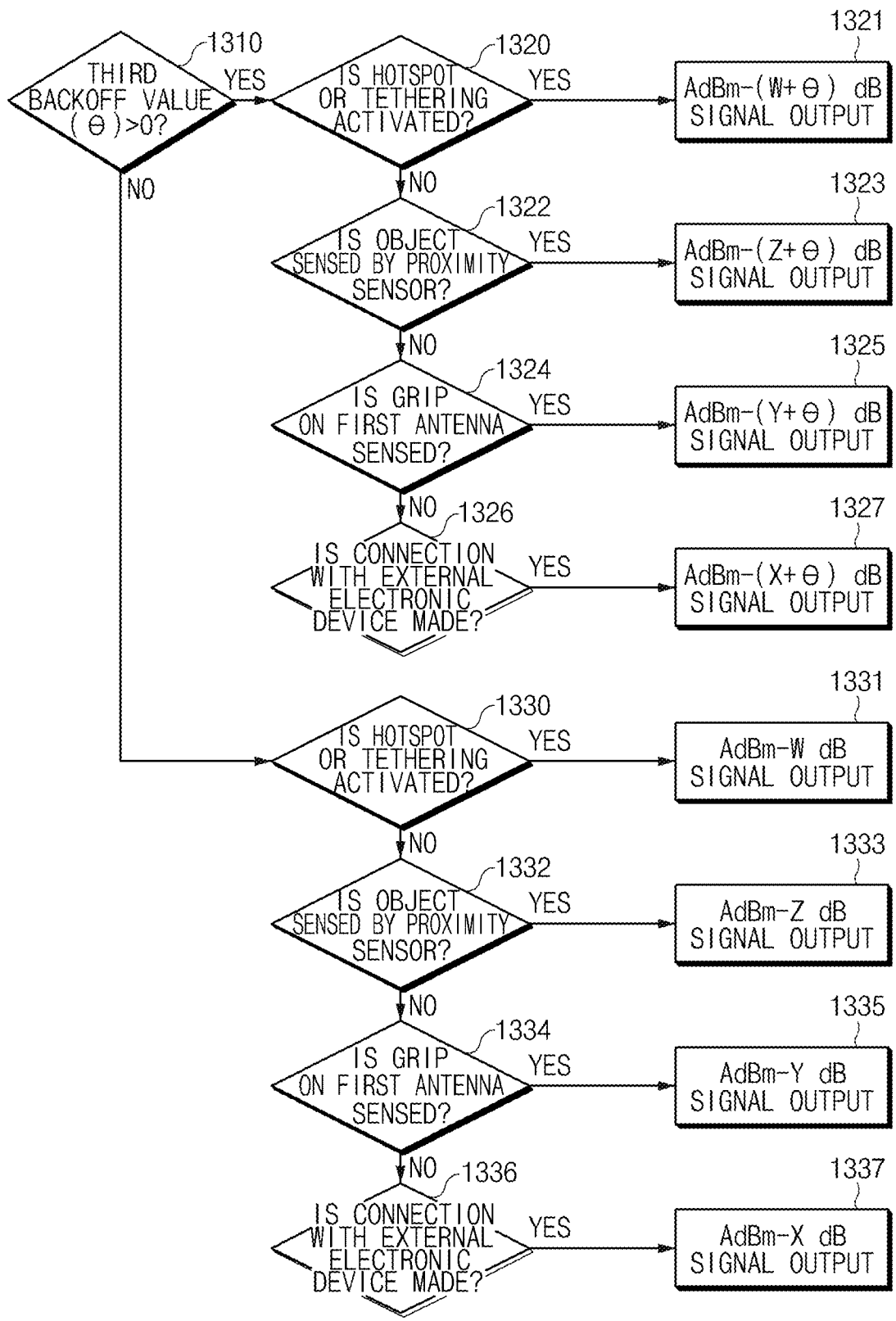
FIG. 13 is a flowchart illustrating an operation of an electronic device according to an embodiment.

When it is determined that the 3-3rd antenna module 830 operates (1025), the electronic device 101 may proceed to operation 1310 of the flowchart 1300 of FIG. 13 (1206). An operation of the electronic device 101 when the 3-3rd antenna module 830 operates will be described with reference to FIG. 13 later.

When it is determined that the 3-3rd antenna module 830 does not operates (1025), the electronic device 101 may again determine whether the 3-1st antenna module 810 operates (1021). Alternatively, according to an embodiment, when it is determined that the 3-3rd antenna module 830 does not operate (1025), the electronic device 101 may determine that the third antenna module 546 does not operate and may process to an operation of determining whether the hotspot or tethering of the electronic device 101 is activated (1030).

Below, an operation of the electronic device 101 when it is determined that the 3-1st antenna module 810 operates will be described with reference to FIGS. 8, 9, and 11.

When it is determined that the 3-1st antenna module 810 operates (1021), the electronic device 101 may determine whether a first backoff value α is greater than "0" (1110). According to an embodiment, because additional backoff of a power of the first antenna 542 is used when a sum of radiation powers of the first antenna 542 and the third antenna module 546 exceeds an SAR reference, the electronic device 101 may determine that the first backoff value α being an additional backoff value can be applied. Accordingly, the electronic device 101 may determine that the first backoff value α being an additional backoff value is greater than "0".

The first backoff value α may be determined in consideration of a LEGACY_NR ratio. The LEGACY_NR ratio may be a variable for determining whether to assign a weight for power backoff to any one of the first RAT and the second RAT when the 3-1st antenna module 810 using the second RAT (e.g., an NR RAT) and the first antenna 542 using the first RAT (e.g., a 2G RAT, a 3G RAT, a 4G RAT, and/or an LTE RAT) simultaneously operate.

The LEGACY_NR ratio may be determined in consideration of the degree of influence on the SAR. Accordingly, the LEGACY_NR ratio may be determined in consideration of a relative location of an antenna module (e.g., the 3-1st antenna module 810, the 3-2nd antenna module 820, or the 3-3rd antenna module 830) using the second RAT (e.g., an NR RAT) to an antenna (e.g., the first antenna 542) using the first RAT (e.g., a 2G RAT, a 3G RAT, a 4G RAT, and/or an LTE RAT). Also, the LEGACY_NR ratio may be determined in consideration of a radio frequency (RF) performance of a field.

Because the 3-1st antenna module 810 is relatively more distant from the first antenna 542 than the 3-2nd antenna module 820 and the 3-3rd antenna module 830, the LEGACY_NR ratio of the 3-1st antenna module 810 may also be relatively smaller than that of the 3-2nd antenna module 820 and the 3-3rd antenna module 830. Because the first backoff value α is capable of being determined in consideration of the LEGACY_NR ratio, the first backoff value α may be determined in consideration of at least one of the degree of influence of the 3-1st antenna module 810 on the SAR, a distance between the 3-1st antenna module 810 and the first antenna 542, and an RF performance of a field. The first backoff value α may be smaller than backoff values of the 3-2nd antenna module 820 and the 3-3rd antenna module 830.

According to various embodiments, the LEGACY_NR ratio of the 3-1st antenna module 810 may be relatively smaller than that of the 3-2nd antenna module 820 and the 3-3rd antenna module 830. Accordingly, a power backoff quantity at the first antenna 542 in the radiation of the first antenna 542 and the 3-1st antenna module 810 may be relatively smaller than that in the radiation of the first antenna 542 and the 3-2nd antenna module 820 or in the radiation of the first antenna 542 and the 3-3rd antenna module 830, and thus, a radiation output power of the first antenna 542 may be relatively higher than a radiation output power of the first antenna 542 in the simultaneous radiation of the first antenna 542 and the 3-2nd antenna module 820 or the 3-3rd antenna module 830.

When it is determined that the first backoff value α is greater than "0" (1110), the electronic device 101 may determine whether the hotspot or tethering of the electronic device 101 is activated (1120).

When the hotspot or tethering of the electronic device 101 is activated (1120), the electronic device 101 may allow a signal output through the first antenna 542 to back off as much as "W+α (first backoff value) dB" (1121). That is, when the hotspot or tethering of the electronic device 101 is activated (1120), the electronic device 101 may output a signal of "A dBm−(W+α) dB" through the first antenna 542 (1121). For example, (W+α) dB may be a value at which electromagnetic waves of the electronic device 101 satisfy the reference for the SAR when performing the power backoff of (W+α) dB on the first antenna 542. Accordingly, when the 3-1st antenna module 810 operates, an output power of the first antenna 542 may be reduced as much as α dB compared to the case where only the first antenna 542 operates.

When the hotspot or tethering of the electronic device 101 is turned off (1120), the electronic device 101 may determine whether a short-range object is sensed by the proximity sensor of the electronic device 101 (1122).

When a short-range object is sensed by the proximity sensor of the electronic device 101 (1122), the electronic device 101 may allow a signal output through the first antenna 542 to back off as much as (Z+α) dB (1123). That is, when a short-range object is sensed by the proximity sensor (1122), the electronic device 101 may output a signal of "A dBm−(Z+α) dB" through the first antenna 542 (1123). For example, (Z+α) dB may be a value at which electromagnetic waves of the electronic device 101 satisfy the reference for the SAR when performing the power backoff of (Z+α) dB on the first antenna 542.

When a short-range object is not sensed by the proximity sensor (1122), the electronic device 101 may determine whether a grip on the first antenna 542 is sensed by the first grip sensor of the electronic device 101 (1124). The first grip sensor may be placed adjacent to the first antenna 542 to sense a grip on the first antenna 542.

When a grip on the first antenna 542 is sensed by the first grip sensor (1124), the electronic device 101 may allow a signal output through the first antenna 542 to back off as much as "Y+α dB" (1125). That is, when a grip on the first antenna 542 is sensed by the first grip sensor (1124), the electronic device 101 may output a signal of "A dBm−(Y+α)

dB" through the first antenna 542 (1125). For example, (Y+α) dB may be a value at which electromagnetic waves of the electronic device 101 satisfy the reference for the SAR when performing the power backoff of (Y+α) dB on the first antenna 542.

When a grip on the first antenna 542 is sensed by the first grip sensor (1124), the electronic device 101 may determine whether a grip on the 3-1st antenna module 810 is sensed by the second grip sensor. The second grip sensor may be placed adjacent to the 3-1st antenna module 810 to sense a grip on the 3-1st antenna module 810. When a grip on the 3-1st antenna module 810 is sensed by the second grip sensor, the electronic device 101 may output a signal of "A dBm–(Y+α') dB" through the first antenna 542. When a grip on the 3-1st antenna module 810 is not sensed by the second grip sensor, the electronic device 101 may output a signal of "A dBm–(Y+α) dB" through the first antenna 542. Here, α<α'.

When a grip on the first antenna 542 is not sensed (1124), the electronic device 101 may determine whether an external electronic device (e.g., an earphone) is connected to a connector hole (e.g., the second connector hole 209 of FIG. 2) (1126).

When an external electronic device is connected (1126), the electronic device 101 may allow a signal output through the first antenna 542 to back off as much as (X+α) dB (1127). That is, when an external electronic device is connected (1126), the electronic device 101 may output a signal of "A dBm–(X+α) dB" through the first antenna 542 (1127). For example, (X+α) dB may be a value at which electromagnetic waves of the electronic device 101 satisfy the reference for the SAR when performing the power backoff of (X+α) dB on the first antenna 542.

When an external electronic device is not connected (1126), the electronic device 101 may output a signal such that a signal output through the first antenna 542 is (A–α) dB. For example, (A–α) dB may be a value at which electromagnetic waves of the electronic device 101 satisfy the reference for the SAR.

An example is illustrated in FIG. 11 as when the hotspot or tethering of the electronic device 101 is not activated (1120), whether a short-range object is sensed by the proximity sensor is determined (1122), as when the hotspot or tethering is not activated (1120) and a short-range object is not sensed by the proximity sensor (1122), whether a grip on the first antenna 542 is sensed by the first grip sensor is determined (1124), and as when the hotspot or tethering is not activated (1120), a short-range object is not sensed by the proximity sensor (1122), and a grip on the first antenna 542 is not sensed by the first grip sensor is determined (1124), whether an external electronic device is connected with the electronic device 101 is determined (1126), but this is only one embodiment. For example, to determine whether the hotspot or tethering is activated (1120), to determine whether a short-range object is sensed by the proximity sensor (1122), to determine whether a grip on the first antenna 542 is sensed by the first grip sensor (1124), and to determine whether an external electronic device is connected with the electronic device 101 (1126) may be independent of each other. The electronic device 101 may independently determine whether the hotspot or tethering is activated (1120), whether a short-range object is sensed by the proximity sensor (1122), whether a grip on the first antenna 542 is sensed by the first grip sensor (1124), and whether an external electronic device is connected with the electronic device 101 (1126) and may determine a backoff value in consideration of at least one corresponding state.

According to various embodiments, operation conditions for determining whether the hotspot or tethering is activated (1120) and whether a short-range object is sensed by the proximity sensor (1122) are simultaneously satisfied, a power backoff quantity for a condition where a backoff quantity is great, for example, (Z+α) dB corresponding to the case where an object is sensed by the proximity sensor may be applied.

When it is determined that the first backoff value α is not greater than "0" (1110), the electronic device 101 may determine whether the hotspot or tethering of the electronic device 101 is activated (1130).

When the hotspot or tethering of the electronic device 101 is activated (1130), the electronic device 101 may output a signal of "A dBm-W dB" through the first antenna 542 (1131).

When the hotspot or tethering of the electronic device 101 is turned off (1130), the electronic device 101 may determine whether a short-range object is sensed by the proximity sensor of the electronic device 101 (1132).

That is, when a short-range object is sensed by the proximity sensor of the electronic device 101 (1132), the electronic device 101 may output a signal of "A dBm-Z dB" through the first antenna 542 (1133).

When a short-range object is not sensed by the proximity sensor (1132), the electronic device 101 may determine whether a grip on the first antenna 542 is sensed by the first grip sensor of the electronic device 101 (1134).

When a grip on the first antenna 542 is sensed by the first grip sensor (1134), the electronic device 101 may output a signal of "A dBm-Y dB" through the first antenna 542 (1135).

When a grip on the first antenna 542 is not sensed (1134), the electronic device 101 may determine whether an external electronic device (e.g., an earphone) is connected to a connector hole (e.g., the second connector hole 209 of FIG. 2) (1136).

When an external electronic device is connected (1136), the electronic device 101 may output a signal of "A dBm-X dB" through the first antenna 542 (1137).

When an external electronic device is not connected (1136), the electronic device 101 may output a signal such that a signal output through the first antenna 542 is A dBm.

Below, an operation of the electronic device 101 when it is determined that the 3-2nd antenna module 820 operates will be described with reference to FIGS. 8, 9, and 12.

When it is determined that the 3-2nd antenna module 820 operates (1021), the electronic device 101 may determine whether a second backoff value/is greater than "0" (1210). According to an embodiment, because additional backoff of a power of the first antenna 542 is used when a sum of radiation powers of the first antenna 542 and the third antenna module 546 exceeds the SAR reference, the electronic device 101 may determine that the second backoff value/being an additional backoff value can be applied. Accordingly, the electronic device 101 may determine that the second backoff value/being an additional backoff value is greater than "0".

The second backoff value/may be determined in consideration of the LEGACY_NR ratio. The LEGACY_NR ratio may be determined in consideration of the degree of influence on the SAR.

Because the 3-2nd antenna module 820 is relatively closer to the first antenna 542 than the 3-1st antenna module 810, the LEGACY_NR ratio of the 3-2nd antenna module 820 may also be relatively greater than that of the 3-1st antenna module 810.

Because the second backoff value/is capable of being determined in consideration of the LEGACY_NR ratio, the second backoff value/may be determined in consideration of at least one of the degree of influence of the 3-2nd antenna module 820 on the SAR, a distance between the 3-2nd antenna module 820 and the first antenna 542, and an RF performance of a field. The second backoff value/may be greater than the first backoff value α of the 3-1st antenna module 810.

According to various embodiments, the LEGACY_NR ratio of the 3-2nd antenna module 820 may be relatively greater than that of the 3-1st antenna module 810. Accordingly, a power backoff quantity at the first antenna 542 in the radiation of the first antenna 542 and the 3-2nd antenna module 820 may be relatively higher than that in the radiation of the first antenna 542 and the 3-1st antenna module 810, and thus, a radiation output power of the first antenna 542 may be relatively lower than a radiation output power of the first antenna 542 in the simultaneous radiation of the first antenna 542 and the 3-1st antenna module 810.

When it is determined that the second backoff value/is greater than "0" (1210), the electronic device 101 may determine whether the hotspot or tethering of the electronic device 101 is activated (1220).

When the hotspot or tethering of the electronic device 101 is activated (1220), the electronic device 101 may allow a signal output through the first antenna 542 to back off as much as "W+Σ(second backoff value) dB" (1221). That is, when the hotspot or tethering of the electronic device 101 is activated (1220), the electronic device 101 may output a signal of "A dBm−(W+Σ) dB" through the first antenna 542 (1221). For example, (W+Σ) dB may be a value at which electromagnetic waves of the electronic device 101 satisfy the reference for the SAR when performing the power backoff of (W+Σ) dB on the first antenna 542. Accordingly, when the 3-2nd antenna module 820 operates, an output power of the first antenna 542 may be reduced as much as Σ dB compared to the case where only the first antenna 542 operates.

When the hotspot or tethering of the electronic device 101 is turned off (1220), the electronic device 101 may determine whether a short-range object is sensed by the proximity sensor of the electronic device 101 (1222).

When a short-range object is sensed by the proximity sensor of the electronic device 101 (1222), the electronic device 101 may allow a signal output through the first antenna 542 to back off as much as (Z+Σ) dB (1223). That is, when a short-range object is sensed by the proximity sensor (1222), the electronic device 101 may output a signal of "A dBm−(Z+Σ) dB" through the first antenna 542 (1223). For example, (Z+Σ) dB may be a value at which electromagnetic waves of the electronic device 101 satisfy the reference for the SAR when performing the power backoff of (Z+Σ) dB on the first antenna 542.

When a short-range object is not sensed by the proximity sensor (1222), the electronic device 101 may determine whether a grip on the first antenna 542 is sensed by the first grip sensor of the electronic device 101 (1224).

When a grip on the first antenna 542 is sensed by the first grip sensor (1224), the electronic device 101 may allow a signal output through the first antenna 542 to back off as much as (Y+Σ) dB (1225). That is, when a grip on the first antenna 542 is sensed by the first grip sensor (1224), the electronic device 101 may output a signal of "A dBm−(Y+Σ) dB" through the first antenna 542 (1225). For example, (Y+Σ) dB may be a value at which electromagnetic waves of the electronic device 101 satisfy the reference for the SAR when performing the power backoff of (Y+Σ) dB on the first antenna 542.

When a grip on the first antenna 542 is sensed by the first grip sensor (1224), the electronic device 101 may determine whether a grip on the 3-2nd antenna module 820 is sensed by a third grip sensor. The third grip sensor may be placed adjacent to the 3-2nd antenna module 820 to sense a grip on the 3-2nd antenna module 820. When a grip on the 3-2nd antenna module 820 is sensed by the third grip sensor, the electronic device 101 may output a signal of "A dBm−(Y+Σ') dB" through the first antenna 542. When a grip on the 3-2nd antenna module 820 is not sensed by the third grip sensor, the electronic device 101 may output a signal of "A dBm−(Y+Σ) dB" through the first antenna 542. Here, Σ<Σ'.

When a grip on the first antenna 542 is not sensed (1224), the electronic device 101 may determine whether an external electronic device (e.g., an earphone) is connected to a connector hole (e.g., the second connector hole 209 of FIG. 2) (1226).

When an external electronic device is connected (1226), the electronic device 101 may allow a signal output through the first antenna 542 to back off as much as (X+Σ) dB (1227). That is, when an external electronic device is connected (1226), the electronic device 101 may output a signal of "A dBm−(X+Σ) dB" through the first antenna 542 (1227). For example, (X+Σ) dB may be a value at which electromagnetic waves of the electronic device 101 satisfy the reference for the SAR when performing the power backoff of (X+Σ) dB on the first antenna 542.

When an external electronic device is not connected (1226), the electronic device 101 may output a signal such that a signal output through the first antenna 542 is (A−Σ) dB. For example, (A−Σ) dB may be a value at which electromagnetic waves of the electronic device 101 satisfy the reference for the SAR.

An example is illustrated in FIG. 12 as when the hotspot or tethering of the electronic device 101 is not activated (1220), whether a short-range object is sensed by the proximity sensor is determined (1222), as when the hotspot or tethering is not activated (1220) and a short-range object is not sensed by the proximity sensor (1222), whether a grip on the first antenna 542 is sensed by the first grip sensor is determined (1224), and as when the hotspot or tethering is not activated (1220), a short-range object is not sensed by the proximity sensor (1222), a grip on the first antenna 542 is not sensed by the first grip sensor is determined (1224), whether an external electronic device is connected with the electronic device 101 is determined (1226), but this is only one embodiment. For example, to determine whether the hotspot or tethering is activated (1220), to determine whether a short-range object is sensed by the proximity sensor (1222), to determine whether a grip on the first antenna 542 is sensed by the first grip sensor (1224), and to determine whether an external electronic device is connected with the electronic device 101 (1226) may be independent of each other. The electronic device 101 may independently determine whether the hotspot or tethering is activated (1220), whether a short-range object is sensed by the proximity sensor (1222), whether a grip on the first antenna 542 is sensed by the first grip sensor (1224), and whether an external electronic device is connected with the electronic device 101 (1226) and may determine a backoff value in consideration of at least one corresponding state.

When it is determined that the second backoff value Σ is not greater than "0" (1210), the electronic device 101 may determine whether the hotspot or tethering of the electronic device 101 is activated (1230).

When the hotspot or tethering of the electronic device 101 is activated (1230), the electronic device 101 may output a signal of "A dBm–W dB" through the first antenna 542 (1231).

When the hotspot or tethering of the electronic device 101 is turned off (1230), the electronic device 101 may determine whether a short-range object is sensed by the proximity sensor of the electronic device 101 (1232).

When a short-range object is sensed by the proximity sensor of the electronic device 101 (1232), the electronic device 101 may output a signal of "A dBm–Z dB" through the first antenna 542 (1233).

When a short-range object is not sensed by the proximity sensor (1232), the electronic device 101 may determine whether a grip on the first antenna 542 is sensed by the first grip sensor of the electronic device 101 (1234).

When a grip on the first antenna 542 is sensed by the first grip sensor (1234), the electronic device 101 may output a signal of "A dBm–Y dB" through the first antenna 542 (1235).

When a grip on the first antenna 542 is not sensed (1234), the electronic device 101 may determine whether an external electronic device (e.g., an earphone) is connected to a connector hole (e.g., the second connector hole 209 of FIG. 2) (1236).

When an external electronic device is connected (1236), the electronic device 101 may output a signal of "A dBm–X dB" through the first antenna 542 (1237).

When an external electronic device is not connected (1236), the electronic device 101 may output a signal such that a signal output through the first antenna 542 is A dBm.

Below, an operation of the electronic device 101 when it is determined that the 3-3rd antenna module 830 operates will be described with reference to FIGS. 8, 9, and 13.

When it is determined that the 3-3rd antenna module 830 operates (1021), the electronic device 101 may determine whether a third backoff value θ is greater than "0" (1310). According to an embodiment, because additional backoff of a power of the first antenna 542 is used when a sum of radiation powers of the first antenna 542 and the third antenna module 546 exceeds the SAR reference, the electronic device 101 may determine that the third backoff value θ being an additional backoff value can be applied. Accordingly, the electronic device 101 may determine that the third backoff value θ being an additional backoff value is greater than "0".

The third backoff value θ may be determined in consideration of the LEGACY_NR ratio. The LEGACY_NR ratio may be determined in consideration of the degree of influence on the SAR.

Because the 3-3rd antenna module 830 is relatively closer to the first antenna 542 than the 3-1st antenna module 810, the LEGACY_NR ratio of the 3-2nd antenna module 820 may also be relatively greater than that of the 3-1st antenna module 810.

Because the third backoff value θ is capable of being determined in consideration of the LEGACY_NR ratio, the third backoff value θ may be determined in consideration of at least one of the degree of influence of the 3-3rd antenna module 830 on the SAR, a distance between the 3-3rd antenna module 830 and the first antenna 542, and an RF performance of a field. The third backoff value θ may be greater than the first backoff value α of the 3-1st antenna module 810.

According to various embodiments, the LEGACY_NR ratio of the 3-3rd antenna module 830 may be relatively greater than that of the 3-1st antenna module 810. Accordingly, a power backoff quantity at the first antenna 542 in the radiation of the first antenna 542 and the 3-3rd antenna module 830 may be relatively higher than that in the radiation of the first antenna 542 and the 3-1st antenna module 810, and thus, a radiation output power of the first antenna 542 may be relatively lower than a radiation output power of the first antenna 542 in the simultaneous radiation of the first antenna 542 and the 3-1st antenna module 810.

When it is determined that the third backoff value θ is greater than "0" (1310), the electronic device 101 may determine whether the hotspot or tethering of the electronic device 101 is activated (1320).

When the hotspot or tethering of the electronic device 101 is activated (1320), the electronic device 101 may allow a signal output through the first antenna 542 to back off as much as "W+θ (third backoff value) dB" (1321). That is, when the hotspot or tethering of the electronic device 101 is activated (1320), the electronic device 101 may output a signal of "A dBm–(W+θ) dB" through the first antenna 542 (1321). For example, (W+θ) dB may be a value at which electromagnetic waves of the electronic device 101 satisfy the reference for the SAR when performing the power backoff of (W+θ) dB on the first antenna 542. Accordingly, when the 3-3rd antenna module 830 operates, an output power of the first antenna 542 may be reduced as much as θ dB compared to the case where only the first antenna 542 operates.

When the hotspot or tethering of the electronic device 101 is turned off (1320), the electronic device 101 may determine whether a short-range object is sensed by the proximity sensor of the electronic device 101 (1322).

When a short-range object is sensed by the proximity sensor of the electronic device 101 (1322), the electronic device 101 may allow a signal output through the first antenna 542 to back off as much as (Z+θ) dB (1323). That is, when a short-range object is sensed by the proximity sensor (1322), the electronic device 101 may output a signal of "A dBm–(Z+θ) dB" through the first antenna 542 (1323). For example, (Z+θ) dB may be a value at which electromagnetic waves of the electronic device 101 satisfy the reference for the SAR when performing the power backoff of (Z+θ) dB on the first antenna 542.

When a short-range object is not sensed by the proximity sensor (1322), the electronic device 101 may determine whether a grip on the first antenna 542 is sensed by the first grip sensor of the electronic device 101 (1324).

When a grip on the first antenna 542 is sensed by the first grip sensor (1324), the electronic device 101 may allow a signal output through the first antenna 542 to back off as much as (Y+θ) dB (1325). That is, when a grip on the first antenna 542 is sensed by the first grip sensor (1324), the electronic device 101 may output a signal of "A dBm–(Y+θ) dB" through the first antenna 542 (1325). For example, (Y+θ) dB may be a value at which electromagnetic waves of the electronic device 101 satisfy the reference for the SAR when performing the power backoff of (Y+θ) dB on the first antenna 542.

When a grip on the first antenna 542 is sensed by the first grip sensor (1324), the electronic device 101 may determine whether a grip on the 3-3rd antenna module 830 is sensed by a fourth grip sensor. The fourth grip sensor may be placed adjacent to the 3-3rd antenna module 830 to sense a grip on the 3-3rd antenna module 830. When a grip on the 3-3rd antenna module 830 is sensed by the fourth grip sensor, the electronic device 101 may output a signal of "A dBm–(Y+θ') dB" through the first antenna 542. When a grip on the 3-3rd antenna module 830 is not sensed by the fourth grip sensor, the electronic device 101 may output a signal of "A dBm–(Y+θ) dB" through the first antenna 542. Here, θ<θ'.

When a grip on the first antenna 542 is not sensed (1324), the electronic device 101 may determine whether an external electronic device (e.g., an earphone) is connected to a connector hole (e.g., the second connector hole 209 of FIG. 2) (1326).

When an external electronic device is connected (1326), the electronic device 101 may allow a signal output through the first antenna 542 to back off as much as (X+θ) dB (1327). That is, when an external electronic device is connected (1326), the electronic device 101 may output a signal of "A dBm–(X+θ) dB" through the first antenna 542 (1327). For example, (X+θ) dB may be a value at which electromagnetic waves of the electronic device 101 satisfy the reference for the SAR when performing the power backoff of (X+θ) dB on the first antenna 542.

When an external electronic device is not connected (1326), the electronic device 101 may output a signal such that a signal output through the first antenna 542 is (A–θ) dB. For example, (A–θ) dB may be a value at which electromagnetic waves of the electronic device 101 satisfy the reference for the SAR.

An example is illustrated in FIG. 13 as when the hotspot or tethering of the electronic device 101 is not activated (1320), whether a short-range object is sensed by the proximity sensor is determined (1322), as when the hotspot or tethering is not activated (1320) and a short-range object is not sensed by the proximity sensor (1322), whether a grip on the first antenna 542 is sensed by the first grip sensor is determined (1324), and as when the hotspot or tethering is not activated (1320), a short-range object is not sensed by the proximity sensor (1322), and a grip on the first antenna 542 is not sensed by the first grip sensor is determined (1324), whether an external electronic device is connected with the electronic device 101 is determined (1326), but this is only one embodiment. For example, to determine whether the hotspot or tethering is activated (1320), to determine whether a short-range object is sensed by the proximity sensor (1322), to determine whether a grip on the first antenna 542 is sensed by the first grip sensor (1324), and to determine whether an external electronic device is connected with the electronic device 101 (1326) may be independent of each other. The electronic device 101 may independently determine whether the hotspot or tethering is activated (1320), whether a short-range object is sensed by the proximity sensor (1322), whether a grip on the first antenna 542 is sensed by the first grip sensor (1324), and whether an external electronic device is connected with the electronic device 101 (1326) and may determine a backoff value in consideration of at least one corresponding state.

When it is determined that the third backoff value θ is not greater than "0" (1310), the electronic device 101 may determine whether the hotspot or tethering of the electronic device 101 is activated (1330).

When the hotspot or tethering of the electronic device 101 is activated (1330), the electronic device 101 may output a signal of "A dBm–W dB" through the first antenna 542 (1331).

When the hotspot or tethering of the electronic device 101 is turned off (1330), the electronic device 101 may determine whether a short-range object is sensed by the proximity sensor of the electronic device 101 (1332).

When a short-range object is sensed by the proximity sensor of the electronic device 101 (1332), the electronic device 101 may output a signal of "A dBm-Z dB" through the first antenna 542 (1333).

When a short-range object is not sensed by the proximity sensor (1332), the electronic device 101 may determine whether a grip on the first antenna 542 is sensed by the first grip sensor of the electronic device 101 (1334).

When a grip on the first antenna 542 is sensed by the first grip sensor (1334), the electronic device 101 may output a signal of "A dBm-Y dB" through the first antenna 542 (1335).

When a grip on the first antenna 542 is not sensed (1334), the electronic device 101 may determine whether an external electronic device (e.g., an earphone) is connected to a connector hole (e.g., the second connector hole 209 of FIG. 2) (1336).

When an external electronic device is connected (1336), the electronic device 101 may output a signal of "A dBm-X dB" through the first antenna 542 (1337).

When an external electronic device is not connected (1336), the electronic device 101 may output a signal such that a signal output through the first antenna 542 is A dBm.

According to various embodiments, whether a camera module (e.g., the camera module 180 of FIG. 1) of the electronic device 101 operates may be further considered to determine a signal output value (or a backoff value) of the first antenna 542.

According to various embodiments, whether an electronic device (e.g., a dex pad) configured to display a display screen of a display device (e.g., the display device 160 of FIG. 1) of the electronic device 101 on another display device is connected with the electronic device 101 may be further considered to determine a signal output value (or a backoff value) of the first antenna 542.

The electronic device 101 may collect all results of determining whether the hotspot or tethering is activated, whether a short-range object is sensed by the proximity sensor, whether a grip on the first antenna 542 is sensed by the first grip sensor, whether an external electronic device is connected with the electronic device 101, whether the camera module of the electronic device 101 operates, and/or whether the dex pad is connected with the electronic device 101 and may determine a final backoff value in consideration of at least one corresponding state.

An example is illustrated in FIG. 11 above as when the 3-1st antenna module 810 and the first antenna 542 simultaneously operate, a signal output of the first antenna 542 backs off; however, according to various embodiments, a signal output of the 3-1st antenna module 810, not the first antenna 542, may back off such that a total of electromagnetic waves that the electronic device 101 emits satisfy the SAR standard. Alternatively, according to various embodiments, a portion of a signal output of the first antenna 542 and a portion of a signal output of the 3-1st antenna module 810 may back off such that a total of electromagnetic waves that the electronic device 101 emits satisfy the SAR standard.

An example is illustrated in FIG. 12 above as when the 3-2nd antenna module 820 and the first antenna 542 simultaneously operate, a signal output of the first antenna 542 backs off; however, according to various embodiments, a signal output of the 3-2nd antenna module 820, not the first antenna 542, may back off such that a total of electromagnetic waves that the electronic device 101 emits satisfy the SAR standard. Alternatively, according to various embodiments, a portion of a signal output of the first antenna 542 and a portion of a signal output of the 3-2nd antenna module 820 may back off such that a total of electromagnetic waves that the electronic device 101 emits satisfy the SAR standard.

An example is illustrated in FIG. 13 above as when the 3-3rd antenna module 830 and the first antenna 542 simultaneously operate, a signal output of the first antenna 542 backs off; however, according to various embodiments, a signal output of the 3-3rd antenna module 830, not the first antenna 542, may back off such that a total of electromagnetic waves that the electronic device 101 emits satisfy the SAR standard. Alternatively, according to various embodiments, a portion of a signal output of the first antenna 542 and a portion of a signal output of the 3-3rd antenna module 830 may back off such that a total of electromagnetic waves that the electronic device 101 emits satisfy the SAR standard.

According to various embodiments, whether the 3-1st antenna module 810 uses a multiple-input and multiple-output (MIMO) technology or uses a single-input single-output (SISO) technology may be further considered to determine a signal output value (or a backoff value) of the first antenna 542 and/or the 3-1st antenna module 810.

According to various embodiments, a band (e.g., n257, n258, n260, n261, or the like defined in the 3GPP) that the 3-1st antenna module 810 uses may be further considered to determine a signal output value (or a backoff value) of the first antenna 542 and/or the 3-1st antenna module 810. According to an embodiment, the 3-1st antenna module 810 may support at least one of 26.5 to 29.5 GHz (n257), 24.25 to 27.50 (n258), 27.5 to 28.35 GHz (n261), and 37 to 40 GHz (n260) bands.

According to various embodiments, a signal output value (or a backoff value) of the first antenna 542 and/or the 3-1st antenna module 810 may vary for each of the cases where the 3-1st antenna module 810 uses the MIMO technology and the n260 band, where the 3-1st antenna module 810 uses the MIMO technology and the n261 band, where the 3-1st antenna module 810 uses the SISO technology and the n260 band, and where the 3-1st antenna module 810 uses the SISO technology and the n261 band.

According to various embodiments, whether the 3-2nd antenna module 820 uses the MIMO technology or uses the SISO technology may be further considered to determine a signal output value (or a backoff value) of the first antenna 542 and/or the 3-2nd antenna module 820.

According to various embodiments, a band (e.g., n257, n258, n260, n261, or the like defined in the 3GPP) that the 3-2nd antenna module 820 uses may be further considered to determine a signal output value (or a backoff value) of the first antenna 542 and/or the 3-2nd antenna module 820. According to an embodiment, the 3-2nd antenna module 820 may support at least one of 26.5 to 29.5 GHz (n257), 24.25 to 27.50 (n258), 27.5 to 28.35 GHz (n261), and 37 to 40 GHz (n260) bands.

According to various embodiments, a signal output value (or a backoff value) of the first antenna 542 and/or the 3-2nd antenna module 820 may vary for each of the cases where the 3-2nd antenna module 820 uses the MIMO technology and the n260 band, where the 3-2nd antenna module 820 uses the MIMO technology and the n261 band, where the 3-2nd antenna module 820 uses the SISO technology and the n260 band, and where the 3-2nd antenna module 820 uses the SISO technology and the n261 band.

According to various embodiments, whether the 3-3rd antenna module 830 uses the MIMO technology or uses the SISO technology may be further considered to determine a signal output value (or a backoff value) of the first antenna 542 and/or the 3-3rd antenna module 830.

According to various embodiments, a band (e.g., n257, n258, n260, n261, or the like defined in the 3GPP) that the 3-3rd antenna module 830 uses may be further considered to determine a signal output value (or a backoff value) of the first antenna 542 and/or the 3-3rd antenna module 830. According to an embodiment, the 3-3rd antenna module 830 may support at least one of 26.5 to 29.5 GHz (n257), 24.25 to 27.50 (n258), 27.5 to 28.35 GHz (n261), and 37 to 40 GHz (n260) bands.

According to various embodiments, a signal output value (or a backoff value) of the first antenna 542 and/or the 3-3rd antenna module 830 may vary for each of the cases where the 3-3rd antenna module 830 uses the MIMO technology and the n260 band, where the 3-3rd antenna module 830 uses the MIMO technology and the n261 band, where the 3-3rd antenna module 830 uses the SISO technology and the n260 band, and where the 3-3rd antenna module 830 uses the SISO technology and the n261 band.

Below, an operation of an electronic device according to an embodiment will be more fully described with reference to FIGS. 5 and 8 to 9. With regard to components identical to the components of the embodiment described above, additional description will be omitted to avoid redundancy.

Referring to FIGS. 5, 8, and 9, the processor 990 may control the second wireless communication circuit 992 to transmit/receive a signal in the first frequency band (e.g., lower than 6 GHz) through the second antenna 544. The second antenna 544 may transmit/receive a signal in the first frequency band (e.g., lower than 6 GHz) based on the second RAT (e.g., an NR RAT).

A portion of the side bezel structure 410, which corresponds to the lower end of the electronic device 101, may be used as the second antenna 544. In this case, the portion of the side bezel structure 410, which corresponds to the lower end of the electronic device 101, may include both the first antenna 542 and the second antenna 544. For example, at least a portion of the first antenna 542 and at least a portion of the second antenna 544 may overlap each other.

In the case of the NSA technology that the 3GPP defines, for the 5G communication, the electronic device 101 may be simultaneously connected with the first base station based on the first RAT (e.g., an LTE RAT) and the second base station based on the second RAT (e.g., an NR RAT). In this case, the first antenna 542 performing communication based on the first RAT may be connected with the first base station, and the second antenna 544 performing communication based on the second RAT may be connected with the second base station. For the 5G communication, the first antenna 542 and the second antenna 544 of the electronic device 101 may simultaneously operate. That the first antenna 542 and the second antenna 544 operate at the same time may be a state where the first antenna 542 transmits or receives a signal based on the first RAT and the second antenna 544 transmits or receives a signal based on the second RAT.

The electronic device 101 may determine whether the first antenna 542 and the second antenna 544 simultaneously operate. According to an embodiment, when the first antenna 542 operates and the second antenna 544 does not operate, the electronic device 101 may output a signal of A dBm through the first antenna 542. For example, A dBm may be a value satisfying the SAR standard. According to an embodiment, when the first antenna 542 operates and the second antenna 544 does not operate, the electronic device 101 may perform determination in order from operation 1020 of FIG. 10.

When it is determined that the first antenna 542 and the second antenna 544 simultaneously operate, the electronic device 101 may output a signal output of the first antenna 542 to back off as much as Q dB. Alternatively, when it is determined that the first antenna 542 and the second antenna 544 simultaneously operate, the electronic device 101 may output a signal output of the second antenna 544 to back off as much as R dB. Alternatively, when it is determined that the first antenna 542 and the second antenna 544 simultaneously operate, the electronic device 101 may output a signal output of the first antenna 542 to back off as much as S dB and may output a signal output of the second antenna 544 to back off as much as T dB.

According to an embodiment, the electronic device 101 may determine a signal output value (or a backoff value) of the first antenna 542 and/or the second antenna 544 in consideration of at least one of whether the hotspot or tethering of the electronic device 101 is activated, whether a neighboring object is sensed through the proximity sensor, whether a grip on the first antenna 542 is sensed, whether a grip on the second antenna 544 is sensed, whether an external electronic device is connected, whether the camera module operates, whether an electronic device (e.g., a dex pad) configured to display a display screen on another display device is connected, a band (e.g., n41, n78, or the like defined in the 3GPP) that the second antenna 544 uses, or the like. The second antenna 544 may support a 2.496 to 2.690 GHz (n41) and/or 3.3 to 3.8 GHz (n78) band. According to an embodiment, the second antenna 544 may also support any other band as well as n41 and n78 defined in the 3GPP.

A power may back off to the same backoff value in all the cases where an antenna module based on the first RAT (e.g., a 2G RAT, a 3G RAT, a 4G RAT, and/or an LTE RAT) operates solely and where the antenna module based on the first RAT and an antenna module based on the second RAT (e.g., an NR RAT) simultaneously operate. For this reason, even when the antenna module based on the first RAT operates solely, a power may back off to a backoff value determined in consideration of the case where the antenna module based on the second RAT operates, thereby allowing a lot of power to back off unnecessarily.

According to various embodiments of the disclosure, by distinguishing a power backoff value of the case where the antenna module based on the first RAT operates solely and a power backoff value of the case where the antenna module based on the first RAT and the antenna module based on the second RAT simultaneously operate, the above unnecessary backoff may be prevented in the case where the antenna module based on the first RAT operates solely, and thus, the reduction of RF performance may be prevented.

According to various embodiments of the disclosure, by separating a process of determining a backoff value in the case where the antenna module based on the first RAT operates solely from a process of determining a backoff value in the case where the antenna module based on the first RAT and the antenna module based on the second RAT simultaneously operate, field performance may be improved when the antenna module based on the first RAT operates solely.

According to various embodiments of the disclosure, by distinguishing a power backoff value of the case where the antenna module based on the first RAT and an antenna module transmitting/receiving a signal in the first frequency band (e.g., lower than 60 GHz) based on the second RAT and a power backoff value of the case where the antenna module based on the first RAT and an antenna module transmitting/receiving a signal in the second frequency band (e.g., 60 GHz or higher) based on the second RAT, unnecessary backoff may be prevented, and field performance may be improved.

According to various embodiments of the disclosure, in the case where the antenna module based on the first RAT and the antenna module based on the second RAT simultaneously operate, by determining a backoff value in consideration of a distance between the antenna module based on the first RAT and the antenna module based on the second RAT, power backoff where there is considered how the antenna module based on the first RAT and the antenna module based on the second RAT mutually influence each other in terms of electromagnetic wave radiation is possible.

According to various embodiments of the disclosure, a power backoff value may be determined more finely by determining whether a grip on an antenna module is sensed for each of a plurality of antenna modules and may determining a backoff value in consideration of determination results.

According to various embodiments of the disclosure, a power backoff value may be determined more finely by determining a backoff value in consideration of at least one of whether a hotspot or tethering operation is performed, whether a neighboring object is sensed through a proximity sensor, whether an external electronic device is connected, whether a camera module operates, whether an electronic device (e.g., a dex pad) configured to display a display screen on another display device is connected, a band that an antenna uses, or the like.

According to various embodiments of the disclosure, backoff may be variously performed depending on whether a plurality of antennas included in an electronic device operate.

Besides, a variety of effects directly or indirectly understood through this disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first antenna configured to transmit and receive a signal in a first frequency band based on a first radio access technology (RAT);
a second antenna configured to transmit and receive a signal in a second frequency band based on a second RAT;
a first wireless communication circuit operatively connected with the first antenna;
a second wireless communication circuit operatively connected with the second antenna;
at least one processor operatively connected with the first wireless communication circuit and the second wireless communication circuit; and
a memory operatively connected with the processor,
wherein the memory stores instructions that, when executed, cause the processor to:
output a first signal with a first power through the first antenna by controlling the first wireless communication circuit, and
when a second signal is output through the second antenna by controlling the second wireless communication circuit while the first signal is output through the first antenna, output the first signal with a power, which is obtained by backing off from the first power as much as a first backoff value through the first antenna by controlling the first wireless communication circuit, wherein the first backoff value is based on a distance between the first antenna and the second antenna.

2. The electronic device of claim 1, wherein the first backoff value in configured to increase as the distance between the first antenna and the second antenna decreases.

3. The electronic device of claim 1, wherein the instructions, when executed, further cause the processor to determine the first backoff value in consideration of a beam radiation direction of the second antenna.

4. The electronic device of claim 1, wherein the instructions, when executed, further cause the processor to control the second wireless communication circuit to output the second signal with a power which is obtained by backing off from a second power as much as a second backoff value.

5. The electronic device of claim 1, wherein:
the first frequency band is lower than 6 GHz; and
the second frequency band is 6 GHz or higher and 60 GHz or lower.

6. The electronic device of claim 1, further comprising a first grip sensor configured to sense a grip on the first antenna,
wherein the instructions, when executed, further cause the processor to determine the first backoff value based on whether the grip on the first antenna is sensed by using the first grip sensor.

7. The electronic device of claim 6, further comprising a second grip sensor configured to sense a grip on the second antenna,
wherein the instructions, when executed, further cause the processor to determine the first backoff value based on whether the grip on the second antenna is sensed by using the second grip sensor.

8. The electronic device of claim 1, further comprising a proximity sensor configured to sense an object within a given range from the electronic device,
wherein the instructions, when executed, further cause the processor to determine the first backoff value based on whether the object within the given range is sensed by using the proximity sensor.

9. The electronic device of claim 1, wherein the instructions, when executed, further cause the processor to determine the first backoff value based on whether a hotspot or tethering function is activated.

10. The electronic device of claim 1, further comprising a connection terminal capable of being wiredly connected with an external electronic device,
wherein the instructions, when executed, further cause the processor to determine the first backoff value based on whether the external electronic device is connected with the connection terminal.

11. The electronic device of claim 1, further comprising a camera,
wherein the instructions, when executed, further cause the processor to determine the first backoff value based on whether the camera operates.

12. The electronic device of claim 1, wherein the instructions, when executed, further cause the processor to: determine the first backoff value based on a band which the second antenna uses to transmit or receive a signal.

13. The electronic device of claim 1, wherein the instructions, when executed, further cause the processor to determine the first backoff value based on whether the second antenna uses a multiple-input and multiple-output (MIMO) technology or uses a single-input single-output (SISO) to transmit or receive a signal.

14. An electronic device comprising:
a first antenna configured to transmit and receive a signal in a first frequency band based on a first RAT;
a second antenna configured to transmit and receive a signal in the first frequency band based on a second RAT;
a first wireless communication circuit operatively connected with the first antenna;
a second wireless communication circuit operatively connected with the second antenna;
a first grip sensor configured to sense a grip on the first antenna;
at least one processor operatively connected with the first wireless communication circuit and the second wireless communication circuit; and
a memory operatively connected with the processor,
wherein the memory stores instructions that, when executed, cause the processor to:
output a first signal with a first power through the first antenna by controlling the first wireless communication circuit, and
when a second signal is output through the second antenna by controlling the second wireless communication circuit while the first signal is output through the first antenna, output the first signal with a power, which is obtained by backing off from the first power as much as a first backoff value through the first antenna by controlling the first wireless communication circuit,
wherein the first backoff value is based on whether the grip on the first antenna is sensed by using the first grip sensor.

15. The electronic device of claim 14, wherein the instructions, when executed, further cause the processor to control the second wireless communication circuit to output the second signal with a power which is obtained by backing off from a second power as much as a second backoff value.

16. The electronic device of claim 14, wherein the first frequency band is lower than 6 GHz.

17. The electronic device of claim 14, further comprising a second grip sensor configured to sense a grip on the second antenna,
wherein the instructions, when executed, further cause the processor to determine the first backoff value based on whether the grip on the second antenna is sensed by using the second grip sensor.

18. The electronic device of claim 14, wherein the instructions, when executed, further cause the processor to determine the first backoff value based on at least one of whether:
an object within a given distance is detected,
a hotspot or tethering function is activated, or
an external electronic device is connected with a connection terminal included in the electronic device.

* * * * *